(12) United States Patent
Yoo et al.

(10) Patent No.: US 11,816,274 B2
(45) Date of Patent: Nov. 14, 2023

(54) DISPLAY DEVICE AND TOUCH INPUT SYSTEM INCLUDING THE SAME

(71) Applicant: SAMSUNG DISPLAY CO., LTD., Yongin-si (KR)

(72) Inventors: Gi Na Yoo, Cheonan-si (KR); Ju Yeon Kim, Asan-si (KR); Won Sang Park, Yongin-si (KR); Chang Woo Shim, Cheonan-si (KR); Seong Jun Lee, Seoul (KR); Dong Hee Choi, Asan-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 17/937,885

(22) Filed: Oct. 4, 2022

(65) Prior Publication Data

US 2023/0259219 A1   Aug. 17, 2023

(30) Foreign Application Priority Data

Feb. 16, 2022   (KR) .......................... 10-2022-0019914

(51) Int. Cl.
| | |
|---|---|
| *G06F 3/03* | (2006.01) |
| *G06F 3/041* | (2006.01) |
| *G06F 3/0354* | (2013.01) |
| *G06F 3/038* | (2013.01) |
| *G06F 3/044* | (2006.01) |

(52) U.S. Cl.
CPC .......... *G06F 3/0317* (2013.01); *G06F 3/0383* (2013.01); *G06F 3/03542* (2013.01); *G06F 3/0412* (2013.01); *G06F 3/0446* (2019.05)

(58) Field of Classification Search
CPC .... G06F 3/0412; G06F 3/0383; G06F 3/0446; G06F 3/0317
USPC .................................................. 345/173, 174
See application file for complete search history.

(56) References Cited

U.S. PATENT DOCUMENTS 8,692,212 B1 * 4/2014 Craft ....................... G06F 3/042
250/458.1
2017/0212610 A1 7/2017 Thomas et al.
(Continued)

FOREIGN PATENT DOCUMENTS

| CN | 104808391 | 7/2015 |
|---|---|---|
| JP | 2016-119065 | 6/2016 |

(Continued)

*Primary Examiner* — Calvin C Ma
(74) *Attorney, Agent, or Firm* — F. Chau & Associates, LLC

(57) ABSTRACT

The present disclosure relates to a display device, a touch input device, and a touch input system, where the display device comprises: a display unit including a plurality of light emitting areas; a plurality of touch electrodes disposed between the plurality of light emitting areas and configured to sense a touch; a plurality of grid patterns separated from the plurality of touch electrodes in a preset shape or formed integrally with the plurality of touch electrodes; and a plurality of code patterns formed in a preset code shape in some areas of a front surface corresponding to the plurality of touch electrodes, wherein the plurality of grid patterns comprise grid reference points of intersecting grid reference lines, and are respectively formed at positions corresponding to the grid reference points.

21 Claims, 24 Drawing Sheets

(56) References Cited

U.S. PATENT DOCUMENTS

2017/0364167 A1* 12/2017 Ribeiro ................. G06F 3/0442
2018/0074694 A1* 3/2018 Lehmann .............. G06F 3/0447

FOREIGN PATENT DOCUMENTS

| KR | 2012-0118017 | 10/2012 |
| KR | 10-2023-0016737 | 2/2023 |

* cited by examiner

FIG. 10
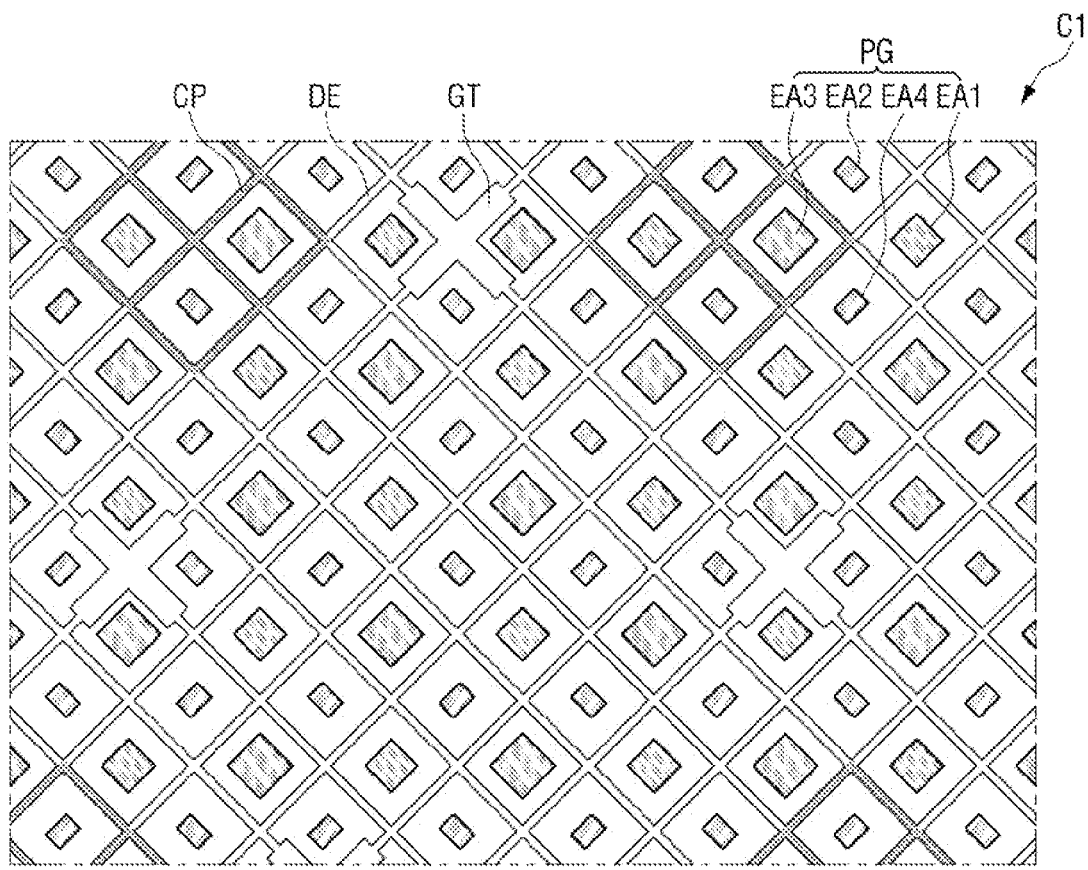
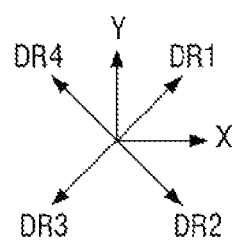

FIG. 16
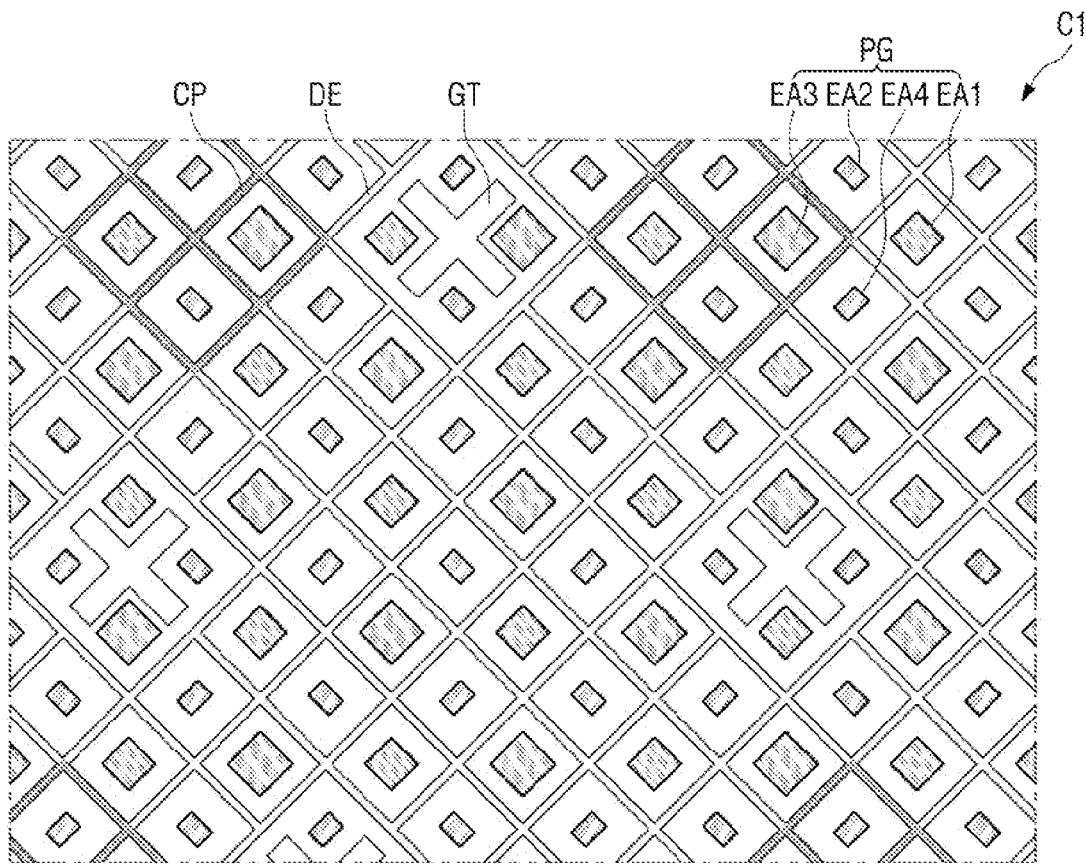
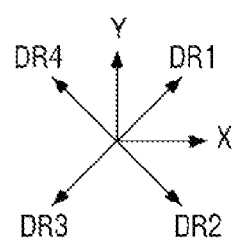

FIG. 18
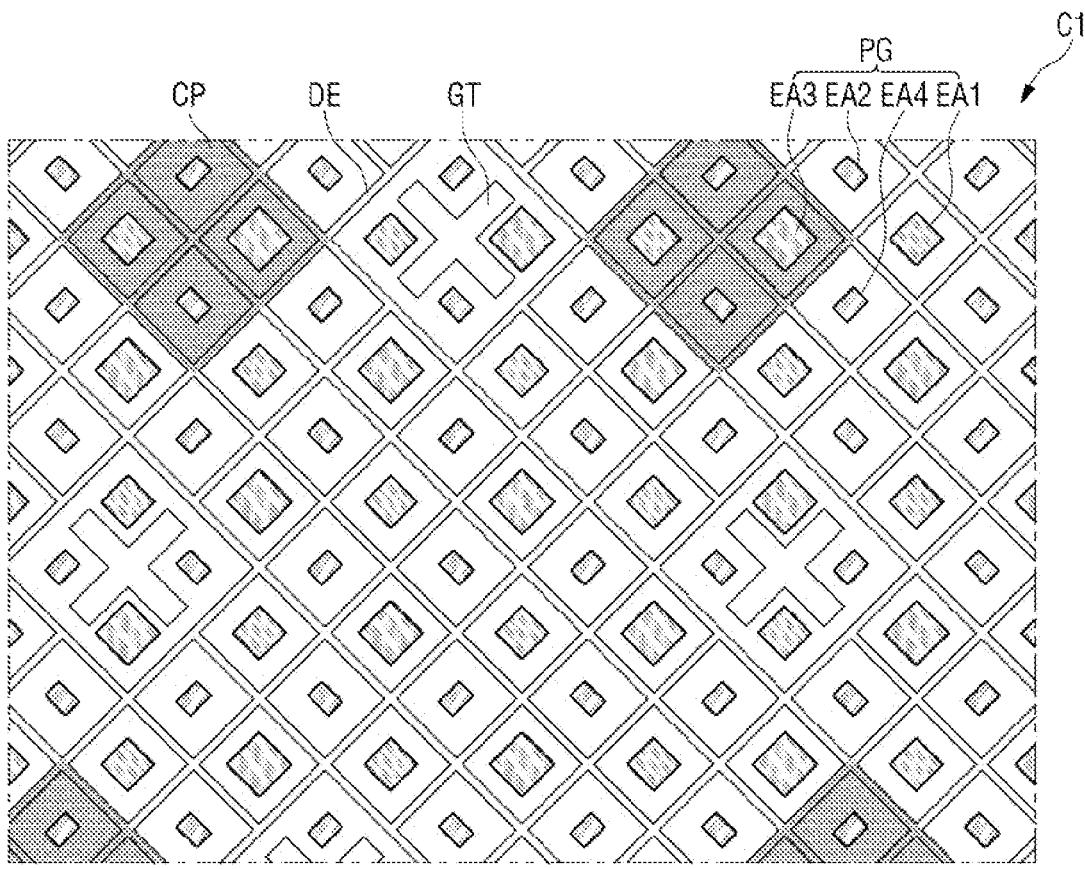
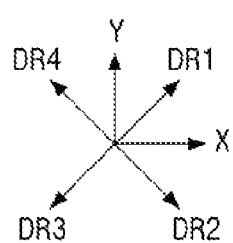

DISPLAY DEVICE AND TOUCH INPUT SYSTEM INCLUDING THE SAME

CROSS-REFERENCE

This application claims priority under 35 U.S.C. § 119 to Korean Patent Application No. 10-2022-0019914 as filed on Feb. 16, 2022 in the Korean Intellectual Property Office, the disclosure of which is herein incorporated by reference in its entirety.

FIELD

The present disclosure relates to a display device and a touch input system including the same.

DISCUSSION

As information technology develops, the usage of display devices for displaying images is increasing. For example, display devices may be applied to various electronic devices such as smartphones, digital cameras, laptop computers, navigation devices, smart televisions, and the like. A display device may be a flat panel display device such as a liquid crystal display device, a field emission display device, or an organic light emitting display device. Among the flat panel display devices, the light emitting display device may include light emitting elements in which each pixel of a display panel may produce and emit light by itself, thereby displaying an image even without a backlight unit providing light to the display panel.

A display device may support a touch input using a natural portion of a user's body (e.g., a finger) as well as a touch input using an electronic pen or the like. For example, by sensing a touch input of an electronic pen, the display device may more precisely sense the touch input with higher resolution than when sensing a touch input of a natural portion of the user's body.

SUMMARY

Embodiments of the present disclosure may provide a display device and/or touch input device capable of accurately sensing a touch input of a touch input device with high resolution using grid patterns and code patterns of a display panel, and a touch input system including the same.

However, embodiments of the present disclosure are not limited to those set forth herein. The above and other embodiments of the present disclosure will become more apparent to those of ordinary skill in the pertinent art by referencing the detailed description of the present disclosure as set forth below.

According to an embodiment of the disclosure, a display device comprises a display unit including a plurality of light emitting areas; a plurality of touch electrodes disposed between the plurality of light emitting areas and configured to sense a touch; a plurality of grid patterns separated from the plurality of touch electrodes in a preset shape or formed integrally with the plurality of touch electrodes; and a plurality of code patterns formed in a preset code shape in some areas of a front surface corresponding to the plurality of touch electrodes, wherein the plurality of grid patterns comprise grid reference points of intersecting grid reference lines, and are respectively formed at positions corresponding to the grid reference points.

In an embodiment, the grid reference lines are formed in a touch input device, and the plurality of grid patterns are formed to protrude in at least one direction from the plurality of touch electrodes at positions of the grid reference points, or are formed to be separated from the plurality of touch electrodes in an island shape at the positions of the grid reference points.

In an embodiment, the plurality of grid patterns are formed to have a width or an extent in at least one of horizontal, vertical, and diagonal directions in plan view that is wider than a width or an extent of each of the plurality of touch electrodes, and have light reflectivity higher than light reflectivity of the surrounding touch electrodes.

In an embodiment, the plurality of grid patterns are respectively formed in a shape of a polygon, a circle, or an ellipse between the light emitting areas adjacent to each other, or are formed in a closed loop shape of one of a rectangle, a square, a circle, or a rhombus surrounding around at least one light emitting area, or are formed in a mesh structure by surrounding between and around the plurality of light emitting areas.

In an embodiment, the plurality of code patterns include a light blocking member for forming a preset planar code shape by covering some of the plurality of touch electrodes with a preset area.

In an embodiment, the plurality of code patterns are respectively formed between the plurality of grid patterns at preset intervals so as not to overlap the plurality of grid patterns, respectively.

In an embodiment, the plurality of code patterns are formed in a closed loop shape of one of a rectangle, a square, a circle, or a rhombus surrounding around at least one light emitting area, or are formed in a mesh structure by surrounding between and around the plurality of light emitting areas.

In an embodiment, the plurality of code patterns are formed to have a wider width than widths of front and side surfaces of the plurality of touch electrodes.

According to an embodiment of the disclosure, a touch input system comprises a display device for displaying an image; and a touch input device for inputting a touch to the display device, wherein the display device includes a display unit including a plurality of light emitting areas; a plurality of touch electrodes disposed between the plurality of light emitting areas to sense a touch; a plurality of grid patterns separated from the plurality of touch electrodes in a preset shape or formed integrally with the plurality of touch electrodes; and a plurality of code patterns formed in a preset code shape in some areas of a front surface corresponding to the plurality of touch electrodes, and the plurality of grid patterns are patterns serving as grid reference points of grid reference lines formed for calculating touch coordinates in the touch input device.

In an embodiment, the plurality of grid patterns are respectively formed at positions corresponding to the grid reference points, and protrude in at least one direction from the plurality of touch electrodes at positions of the grid reference points, or are formed to be separated from the plurality of touch electrodes in an island shape at the positions of the grid reference points.

In an embodiment, the plurality of grid patterns are formed to have a width or an extent in at least one of horizontal, vertical, and diagonal directions in plan view that is wider than a width or an extent of each of the plurality of touch electrodes, and have light reflectivity higher than light reflectivity of the surrounding touch electrodes.

In an embodiment, the plurality of grid patterns are respectively formed in a shape of a polygon, a circle, or an ellipse between the light emitting areas adjacent to each other, or are formed in a closed loop shape of one of a rectangle, a square, a circle, or a rhombus surrounding around at least one light emitting area, or are formed in a mesh structure by surrounding between and around the plurality of light emitting areas.

In an embodiment, the plurality of code patterns include a light blocking member for forming a preset planar code shape by covering some of the plurality of touch electrodes with a preset area.

In an embodiment, the plurality of code patterns are respectively formed between the plurality of grid patterns at preset intervals so as not to overlap the plurality of grid patterns, respectively.

In an embodiment, the plurality of code patterns are formed in a closed loop shape of one of a rectangle, a square, a circle, or a rhombus surrounding around at least one light emitting area, or are formed in a mesh structure by surrounding between and around the plurality of light emitting areas.

In an embodiment, the plurality of code patterns are formed to have a wider width than widths of front and side surfaces of the plurality of touch electrodes.

In an embodiment, further comprising a code detection unit sensing the plurality of grid patterns and the plurality of code patterns to detect grid pattern shape data and code pattern shape data; and a code processor identifying shapes and arrangement structures of the plurality of grid patterns and the plurality of code patterns, respectively, to extract coordinate data.

In an embodiment, the code detection unit generates the grid pattern shape data according to an amount of reflected light reflected from the plurality of grid patterns, a reflection shape, and an arrangement position, and generates and outputs the code pattern shape data according to a reflection shape reflected from the plurality of code patterns and an arrangement position.

In an embodiment, the code processor extracts and forms the plurality of grid reference lines by connecting arrangement positions of the plurality of grid patterns with a straight line based on the arrangement positions of the plurality of grid patterns included in the grid pattern shape data.

In an embodiment, the code processor matches and compares the plurality of grid reference lines with the code pattern shape data to extract touch position coordinates and coordinate data according to a comparison result, and transmits the touch position coordinates and the coordinate data to the display device.

According to an embodiment of the disclosure, a touch input device comprises: a code processor configured for calculating touch coordinates; and grid reference lines coupled to the code processor, wherein the grid reference lines form an intersecting pattern, wherein the intersecting pattern defines grid reference points at intersections of the grid reference lines, wherein the grid reference points define grid reference patterns relative to touch electrodes, wherein code patterns define a preset code shape corresponding to the touch electrodes.

According to a display device and touch input system embodiment of the present disclosure, it may be possible to reduce manufacturing cost by forming the grid patterns and the code patterns on the display panel without adding a separate work process such as additionally using a mask.

According to a display device and touch input system embodiment of the present disclosure, without complicated calculations and corrections by using the grid patterns and the code patterns of the display panel, touch coordinate data of the touch input device may be accurately generated with high resolution, and a touch input of the touch input device may be performed. In particular, it may be possible to perform a touch input function based on increasingly accurate high-resolution input coordinates without errors caused by inclination or the like, reduce power consumption, and/or simplify a driving process.

However, embodiments are not restricted to those set forth herein. The metes and bounds of the above and other embodiments will become most apparent to those of ordinary skill in the art to which the disclosure pertains by referencing the appended claims.

BRIEF DESCRIPTION OF THE DRAWINGS

The above and other embodiments of the present disclosure will become more apparent by describing in detail examples thereof with reference to the attached drawings, in which:

FIG. 10 is an enlarged view diagram illustrating area C1 of FIG. 9;

FIG. 16 is an enlarged view diagram illustrating area C1 of FIG. 15;

FIG. 18 is an enlarged view diagram illustrating area C1 of FIG. 17;

DETAILED DESCRIPTION

The present disclosure will now be described more fully hereinafter with reference to the accompanying drawings, in which embodiments of disclosure are shown. This invention may, however, be embodied in different forms and should not be construed as limited to the embodiments set forth herein. Rather, these embodiments are provided for description by way of example so that this disclosure will be thorough and complete, and may fully convey the scope thereof to those skilled in the art.

It shall be understood that when a layer is referred to as being "on" another layer or substrate, it can be directly on the other layer or substrate, or intervening layers may also be present. The same or like reference numbers may indicate the same or like components throughout the specification.

It shall be understood that, although the terms "first," "second," and the like may be used herein to describe various elements, these elements should not be limited by these terms. These terms are simply used to distinguish one element from another element. For instance, a first element discussed below could be termed a second element without departing from the teachings of the present disclosure. Similarly, the second element could also be termed the first element.

Each of the features of the various embodiments of the present disclosure may be combined with another or combined with each other, in part or in whole, and technically various interlocking and driving embodiments are possible. Each embodiment may be implemented independently of each other embodiment or may be implemented together in an association.

Hereinafter, specific embodiments will be described with reference to the accompanying drawings.

Figure 1:
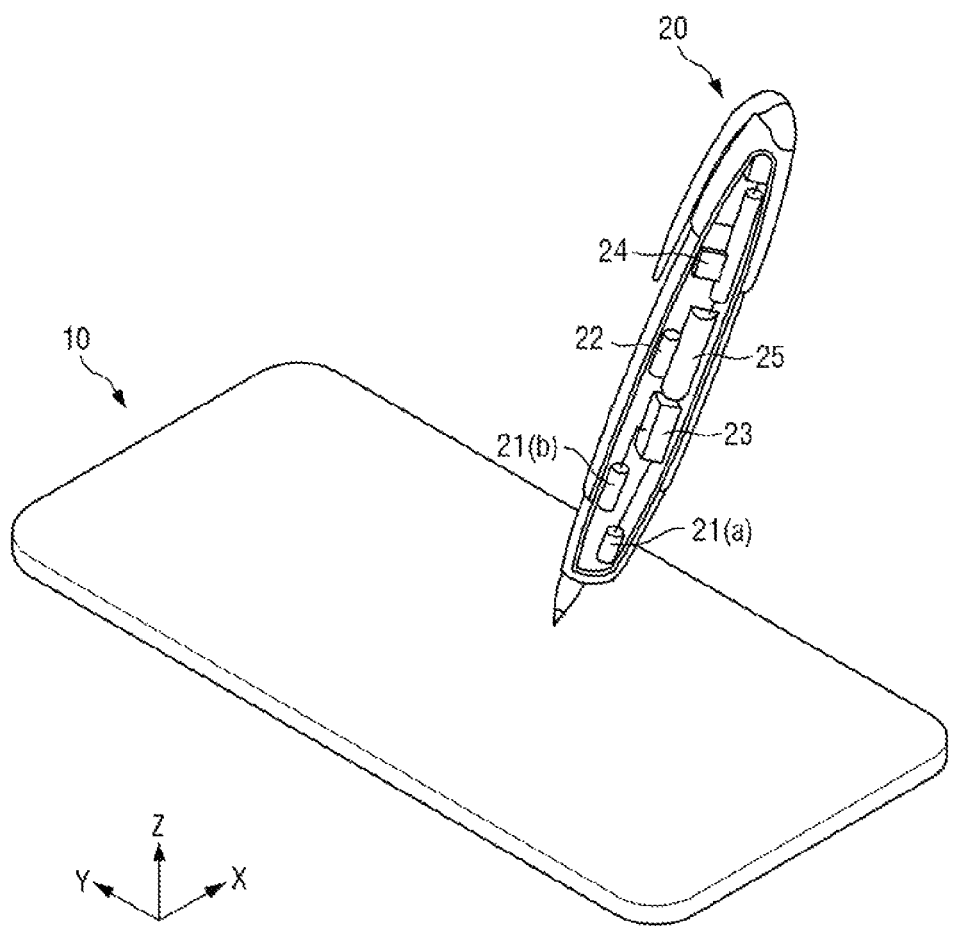
FIG. 1 is a configuration diagram illustrating a touch input system according to an embodiment of the present disclosure.
Figure 2:
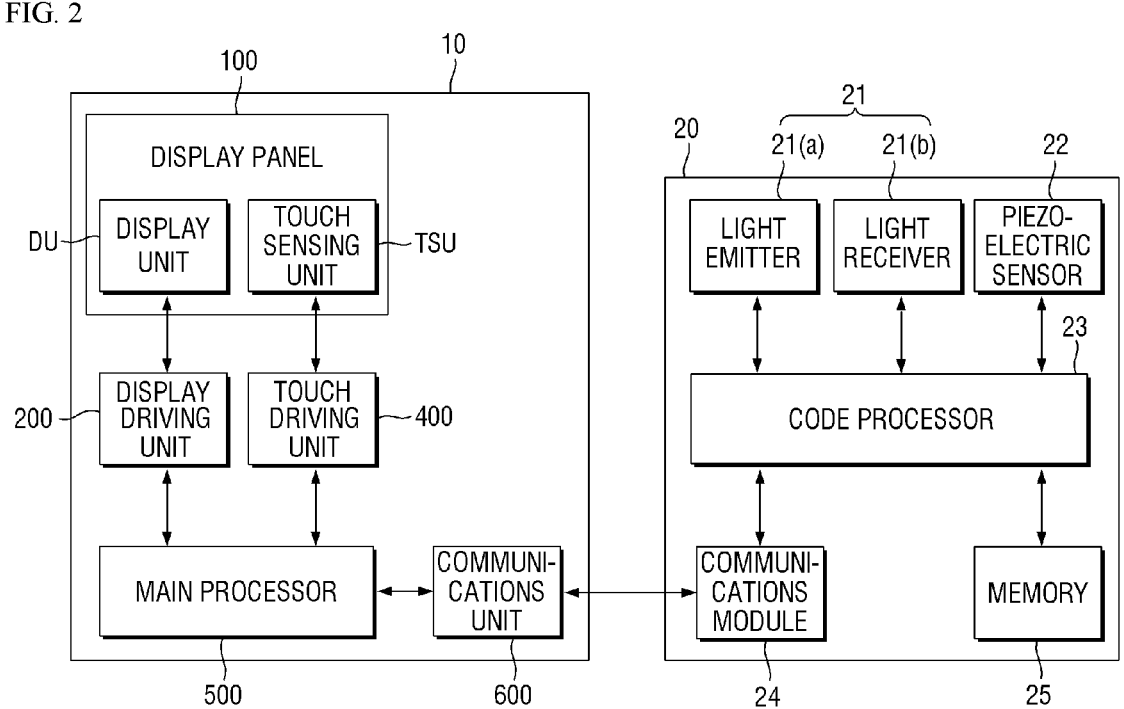
FIG. 2 is a configuration block diagram illustrating a touch input device and a display device shown in FIG. 1.

FIG. 1 illustrates a touch input system according to an embodiment of the present disclosure. FIG. 2 illustrates a touch input device and a display device shown in FIG. 1.

Referring to FIGS. 1 and 2, a display device 10 may be applied to portable electronic devices such as mobile phones, smartphones, tablets, personal computers (PCs), mobile communication terminals, electronic notebooks, electronic books, portable multimedia players (PMPs), navigation devices, and ultra-mobile PCs (UMPCs). For example, the display device 10 may be applied to display units of televisions, laptop computers, monitors, billboards, or Internet of Things (IOT) devices. As an example, the display device 10 may be applied to wearable devices such as smart watches, watch phones, glasses-type displays, and head mounted displays (HMDs).

The display device 10 includes a display panel 100, a display driving unit 200, a touch driving unit 400, a main processor 500, and a communications unit 600. In addition, a touch input device 20 includes a code detection unit 21, a piezoelectric sensor 22, a code processor 23, a communications module 24, and a memory 25.

The display device 10 is configured to use the touch input device 20 as a touch input mechanism. The display panel 100 of the display device 10 may include a display unit DU configured for displaying an image, and a touch sensing unit TSU configured for sensing a human body part, such as a finger, with the touch input device 20.

The display unit DU of the display panel 100 may include a plurality of pixels and be configured to display an image through the plurality of pixels. The touch sensing unit TSU of the display panel 100 may be formed on a front surface of the display panel 100.

The touch sensing unit TSU may include a plurality of touch electrodes configured to sense a user's touch using a capacitance type of sensing. In addition, the touch sensing unit TSU further includes a plurality of grid patterns formed of the same material as the plurality of touch electrodes through the same process as the plurality of touch electrodes when forming the plurality of touch electrodes, and a plurality of code patterns formed by being patterned on some but not necessarily all of the plurality of touch electrodes. The grid patterns and the code patterns of the touch sensing unit TSU are sensed by the touch input device 20 when the touch input device 20 senses an infrared light emission or reflection.

The plurality of grid patterns are patterns configured for serving as grid reference points of a plurality of grid reference lines when the touch input device 20 forms the plurality of grid reference lines for calculating position coordinates, and may be formed integrally with the plurality of touch electrodes or may be formed separately from the plurality of touch electrodes.

The plurality of grid patterns may be respectively formed at preset grid reference point positions to form the plurality of grid reference lines. The plurality of grid patterns may be formed to protrude in at least one direction from the plurality of touch electrodes at each grid reference point position. Alternatively, the plurality of grid patterns may be separated from the plurality of touch electrodes at each reference point position, and may be formed in a shape having a preset area of a circle, an ellipse, or a polygon, without limitation thereto. Each grid pattern may be formed to have a width or an extent in at least one of horizontal, vertical, and diagonal directions in plan view that is wider than a width of each touch electrode. Accordingly, light reflectivity of each grid pattern may be formed to be higher than that of the touch electrodes around the grid pattern.

Code patterns of a planar code shape are formed and disposed on a portion of front surfaces of some of the plurality of touch electrodes at preset intervals. The code patterns of the display panel 100 are formed of a light blocking member that forms a preset planar code shape by covering some of the plurality of touch electrodes with a predetermined area. The code patterns are sensed by the touch input device 20 according to the planar code shape of the light blocking member and a size of the planar code.

The code patterns need not be directly formed on the front surfaces of the touch patterns, but may be formed on a separate transparent film and disposed on a front surface of the touch sensing unit TSU together with the transparent film. In this case, the code patterns may be formed to correspond to arrangement positions of the touch electrodes on the transparent film. A formation structure of the code patterns disposed on the upper or front surface of the touch sensing unit TSU may be applied in various structures and is not limited to any one embodiment. However, hereinafter, an example in which the code patterns are directly formed in some areas of the front surfaces of the touch patterns will be described, and a detailed formation structure of the code patterns may be described in greater detail with reference to the accompanying drawings.

The display driving unit 200 may output signals and voltages for driving the display unit DU. The display driving unit 200 may supply data voltages to data lines. The display driving unit 200 may supply a power voltage to a power line and may supply gate control signals to a gate driving unit.

The touch driving unit 400 may be connected to the touch sensing unit TSU. The touch driving unit 400 may supply a touch driving signal to the plurality of touch electrodes of the touch sensing unit TSU, and may sense an amount of change in capacitance between the plurality of touch electrodes. The touch driving unit 400 may calculate whether a user's touch input is made and touch coordinates based on the amount of change in capacitance between the plurality of touch electrodes.

The main processor 500 may control any functions of the display device 10. For example, the main processor 500 may supply digital video data to the display driving unit 200 so that the display panel 100 displays an image. For example, the main processor 500 may receive touch data from the touch driving unit 400 to determine the user's touch coordinates, then generate digital video data according to the touch coordinates or execute an application indicated by an icon displayed on the user's touch coordinates. As an example, the main processor 500 may receive coordinate data from the touch input device 20 to determine the touch coordinates of the touch input device 20, then generate digital video data according to the touch coordinates or execute an application indicated by an icon displayed on the touch coordinates of the touch input device 20.

The communication unit 600 may perform wired/wireless communication with an external device. For example, the communication unit 600 may transmit and receive communication signals to and from the communication module 24 of the touch input device 20. The communication unit 600 may receive coordinate data composed of data codes from the touch input device 20, and may provide the coordinate data to the main processor 500.

The touch input device 20 may be used as a touch input mechanism and may be configured as an electronic pen such as a smart pen. The touch input device 20 is an electronic pen that senses display light of the display panel 100 or light reflected from the display panel 100 using an optical type, and may detect the grid patterns and the code patterns included in the display panel 100 based on the sensed light and generate the coordinate data. The touch input device 20 may be an electronic pen having a shape of a writing instrument, but is not limited to such shape or structure of the writing instrument.

The code detection unit 21 of the touch input device 20 is disposed at a position adjacent to a pen tip of the touch input device 20 to sense the grid patterns and the code patterns included in the display panel 100. To this end, the code detection unit 21 includes at least one light emitting unit 21(a) for emitting infrared light using at least one infrared light source, and at least one light receiving unit 21(b) for detecting infrared light reflected from the grid patterns and the code patterns with an infrared camera.

At least one infrared light source included in the light emitting unit 21(a) may be configured as an infrared LED array having a matrix structure. In addition, the infrared camera of the light receiving unit 21(b) may include a filter that blocks wavelength bands other than the infrared rays and allows the infrared rays to pass therethrough, a lens system for focusing the infrared rays that have passed through the filter, and an optical image sensor that converts an optical image formed by the lens system into an electrical image signal and outputs the converted image signal. Like the infrared LED array, the optical image sensor may be configured as an array having a matrix structure to provide shape data of the grid patterns and the code patterns to the code processor 23 according to the shape and amount of reflected light reflected from the grid patterns and the code patterns. In this way, the code detection unit 21 of the touch input device 20 may continuously detect the grid patterns and the code patterns according to the user's control and movement, and continuously generate the shape data of the grid patterns and the code patterns to provide the generated shape data to the code processor 23.

The code processor 23 may continuously receive the shape data of the grid patterns and the code patterns from the code detection unit 21. The code processor 23 continuously receives the shape data for the grid patterns and the code patterns, and identifies the shape and arrangement structure of the grid patterns and the code patterns, respectively, to extract or generate coordinate data.

For example, the code processor 23 receives the shape data for the grid patterns to extract and form a plurality of grid reference lines based on the arrangement positions of the grid patterns. In addition, the code processor 23 extracts touch position coordinates and coordinate data according to a result of comparing the plurality of grid reference lines and the arrangement positions of the code patterns by matching and comparing the plurality of grid reference lines with the shape data of the code patterns. The code processor 23 transmits the coordinate data including the touch position coordinates to the display device 10 through the communication module 24. In this way, the code processor 23 may quickly generate the coordinate data in real time without complicated calculation and correction by continuously generating the touch position coordinates and the coordinate data corresponding to a shape of the result of comparing the plurality of grid reference lines and the arrangement positions of the code patterns.

The communication module 24 may perform wired/wireless communication with an external device. For example, the communication module 24 may transmit and receive communication signals to and from the communication unit 600 of the display device 10. The communication module 24 may receive the coordinate data including the touch position coordinates from the code processor 23, and may provide the coordinate data to the communication unit 600.

The memory 25 may store data used for driving the touch input device 20. The memory 25 stores the shape image or shape data of the result of comparing the plurality of grid reference lines and the arrangement positions of the code patterns, and the touch position coordinates and coordinate data corresponding to the shape image or the shape data. The memory 25 shares the shape image or the shape data of the result of comparing the plurality of grid reference lines and the arrangement positions of the code patterns, and the touch position coordinates and the coordinate data corresponding to the shape image or the shape data with the code processor 23. Accordingly, the code processor 23 matches and compares the plurality of grid reference lines with the arrangement positions of the code patterns. In addition, code processor 23 may extract touch position coordinates and coordinate data according to a comparison result by matching and comparing the matching and comparison result with the shape image or shape data of the arrangement position comparison result stored in the memory 25.

Figure 3:
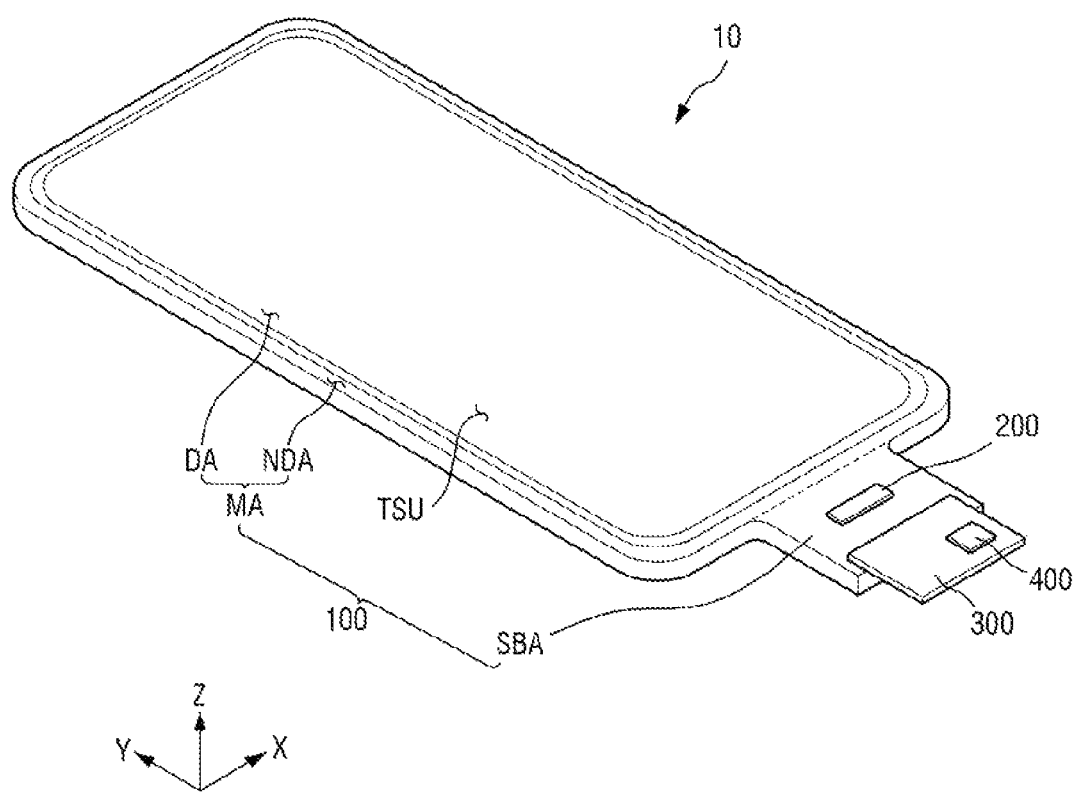
FIG. 3 is a perspective view illustrating a configuration of the display device shown in FIG. 2.

FIG. 3 illustrates a configuration of the display device shown in FIG. 2. In addition, FIG. 4 illustrates a configuration of the display device shown in FIG. 2.

Figure 4:
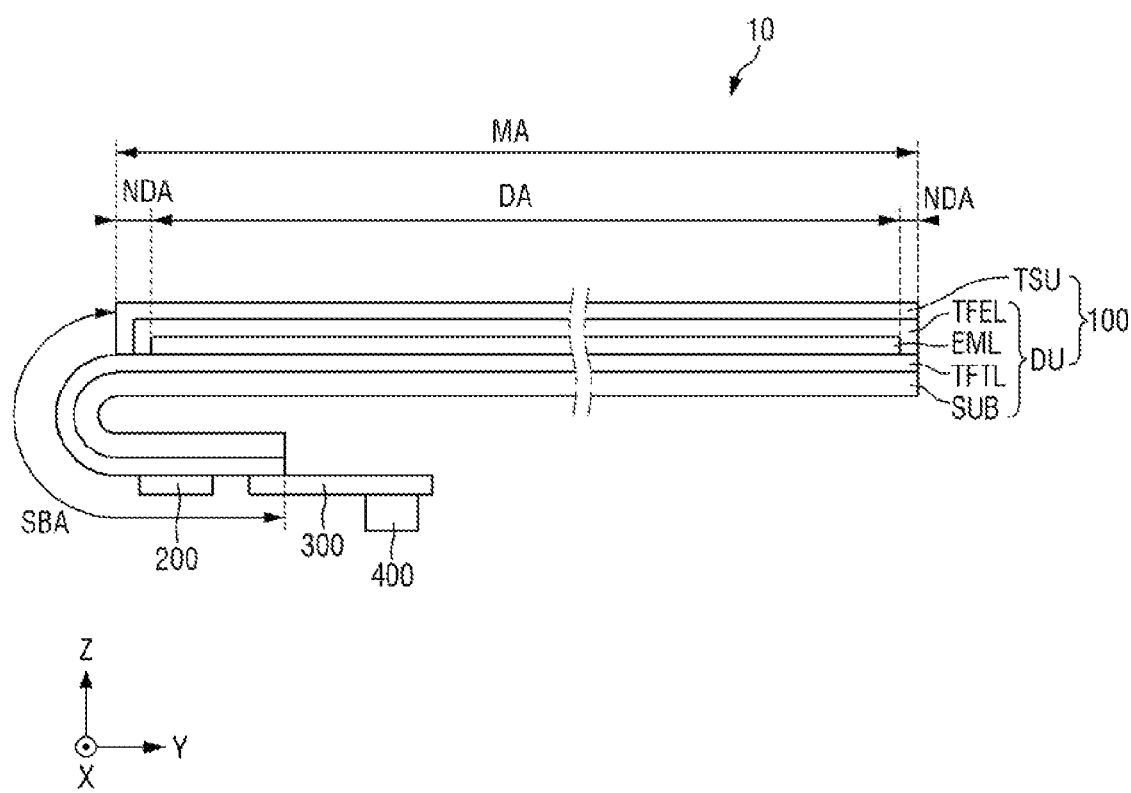
FIG. 4 is a cross-sectional view diagram illustrating a configuration of the display device shown in FIG. 2.

Referring to FIGS. 3 and 4, the display device 10 may have a planar shape similar to a quadrangle. For example, the display device 10 may have a planar shape similar to a quadrangle having a short side in an X-axis direction and a long side in a Y-axis direction. A corner where the short side in the X-axis direction and the long side in the Y-axis direction meet may be rounded to have a predetermined curvature or may be formed at a right angle. The planar shape of the display device is not limited to the quadrangle, and may be formed similarly to other polygons, circles, or ovals.

The display panel 100 may include a main area MA and a sub-area SBA.

The main area MA may include a display area DA including pixels displaying an image, and a non-display area NDA disposed around the display area DA. The display area DA may emit light from a plurality of light emitting areas or a plurality of opening areas. For example, the display panel 100 may include a pixel circuit including switching elements, a pixel defining layer defining a light emitting area or an opening area, and a self-light emitting element.

The non-display area NDA may be an area outside the display area DA. The non-display area NDA may be defined as an edge area of the main area MA of the display panel 100. The non-display area NDA may include a gate driving unit (not illustrated) supplying gate signals to the gate lines, and fan-out lines (not illustrated) connecting the display driving unit 200 and the display area DA.

The sub-area SBA may extend from one side of the main area MA. The sub-area SBA may include a flexible material that may be bent, folded, rolled, or the like. For example, when the sub-area SBA is bent, the sub-area SBA may overlap the main area MA in the thickness direction (Z-axis direction). The sub-area SBA may include the display driving unit 200 and the pad portion connected to a circuit board 300. Optionally, the sub-area SBA may be omitted, and the display driving unit 200 and the pad portion may be disposed in the non-display area NDA.

The display driving unit 200 may be formed as an integrated circuit (IC) and mounted on the display panel 100 by a chip on glass (COG) method, a chip on plastic (COP) method, or an ultrasonic bonding method. For example, the display driving unit 200 may be disposed in the sub-area SBA, and may overlap the main area MA in the thickness direction (Z-axis direction) by bending of the sub-area SBA. As an example, the display driving unit 200 may be mounted on the circuit board 300.

The circuit board 300 may be attached to the pad portion of the display panel 100 using an anisotropic conductive film (ACF). Lead lines of the circuit board 300 may be electrically connected to the pad portion of the display panel 100. The circuit board 300 may be a flexible film such as a flexible printed circuit board, a printed circuit board, or a chip on film.

The touch driving unit 400 may be mounted on the circuit board 300. The touch driving unit 400 may be formed as an integrated circuit (IC). As described above, the touch driving unit 400 may supply the touch driving signal to the plurality of touch electrodes of the touch sensing unit TSU, and may sense the amount of change in capacitance between the plurality of touch electrodes. Here, the touch driving signal may be a pulse signal having a predetermined frequency. The touch driving unit 400 calculates whether a touch input of a user's body part, such as a finger is made and touch coordinates based on the amount of change in capacitance between the plurality of touch electrodes.

Referring to FIG. 4, the display panel 100 may include a display unit DU, a touch sensing unit TSU, and a polarizing film (not illustrated). The display unit DU may include a substrate SUB, a thin film transistor layer TFTL, a light emitting element layer EML, and an encapsulation layer TFEL.

The substrate SUB may be a base substrate or a base member. The substrate SUB may be a flexible substrate that may be bent, folded, and rolled. For example, the substrate SUB may include a glass material or a metal material, but is not limited thereto. As an example, the substrate SUB may include a polymer resin such as polyimide $\mu l$.

The thin film transistor layer TFTL may be disposed on the substrate SUB. The thin film transistor layer TFTL may include a plurality of thin film transistors constituting a pixel circuit of pixels. The thin film transistor layer TFTL may further include gate lines, data lines, power lines, gate control lines, fan-out lines connecting the display driving unit 200 and the data lines, and lead lines connecting the display driving unit 200 and the pad portion. When the gate driving unit is formed on one side of the non-display area NDA of the display panel 100, the gate driving unit may also include the thin film transistors.

The thin film transistor layer TFTL may be disposed in the display area DA, the non-display area NDA, and the sub-area SBA. The thin film transistors, the gate lines, the data lines, and the power lines of each of the pixels of the thin film transistor layer TFTL may be disposed in the display area DA. The gate control lines and the fan-out lines of the thin film transistor layer TFTL may be disposed in the non-display area NDA. The lead lines of the thin film transistor layer TFTL may be disposed in the sub-area SBA.

The light emitting element layer EML may be disposed on the thin film transistor layer TFTL. The light emitting element layer EML may include a plurality of light emitting elements in which a first electrode, a light emitting layer, and a second electrode are sequentially stacked to emit light, and a pixel defining layer defining pixels. The plurality of light emitting elements of the light emitting element layer EML may be disposed in the display area DA. The light emitting layer may be an organic light emitting layer including an organic material. The light emitting layer may include a hole transporting layer, an organic light emitting layer, and an electron transporting layer. When the first electrode receives a predetermined voltage through the thin film transistor of the thin film transistor layer TFTL, and the second electrode receives a cathode voltage, holes and electrons may move to the organic light emitting layer through the hole transporting layer and the electron transporting layer, respectively, and may be combined with each other in the organic light emitting layer to emit light. For example, the first electrode may be an anode electrode and the second electrode may be a cathode electrode, but is not limited thereto.

As an example, the plurality of light emitting elements may include a quantum dot light emitting diode including a quantum dot light emitting layer or an inorganic light emitting diode including an inorganic semiconductor.

The encapsulation layer TFEL may cover a top surface and side surfaces of the light emitting element layer EML, and may protect the light emitting element layer EML. The encapsulation layer TFEL may include at least one inorganic layer and at least one organic layer for encapsulating the light emitting element layer EML.

The touch sensing unit TSU may be disposed on the encapsulation layer TFEL. The touch sensing unit TSU may include a plurality of touch electrodes for sensing a user's touch in a capacitance type, and touch lines connecting the plurality of touch electrodes and the touch driving unit 400. For example, the touch sensing unit TSU may sense a user's touch in a self-capacitance type or a mutual capacitance type.

As an example, the touch sensing unit TSU may be disposed on a separate substrate disposed on the display unit DU. In this case, the substrate supporting the touch sensing unit TSU may be a base member that encapsulates the display unit DU.

The plurality of touch electrodes of the touch sensing unit TSU may be disposed in a touch sensor area overlapping the display area DA. The touch lines of the touch sensing unit TSU may be disposed in a touch peripheral area overlapping the non-display area NDA.

The sub-area SBA of the display panel 100 may extend from one side of the main area MA. The sub-area SBA may include a flexible material that may be bent, folded, rolled, or the like. For example, when the sub-area SBA is bent, the sub-area SBA may overlap the main area MA in the thickness direction (Z-axis direction). The sub-area SBA may include the display driving unit 200 and the pad portion connected to a circuit board 300.

Figure 5:
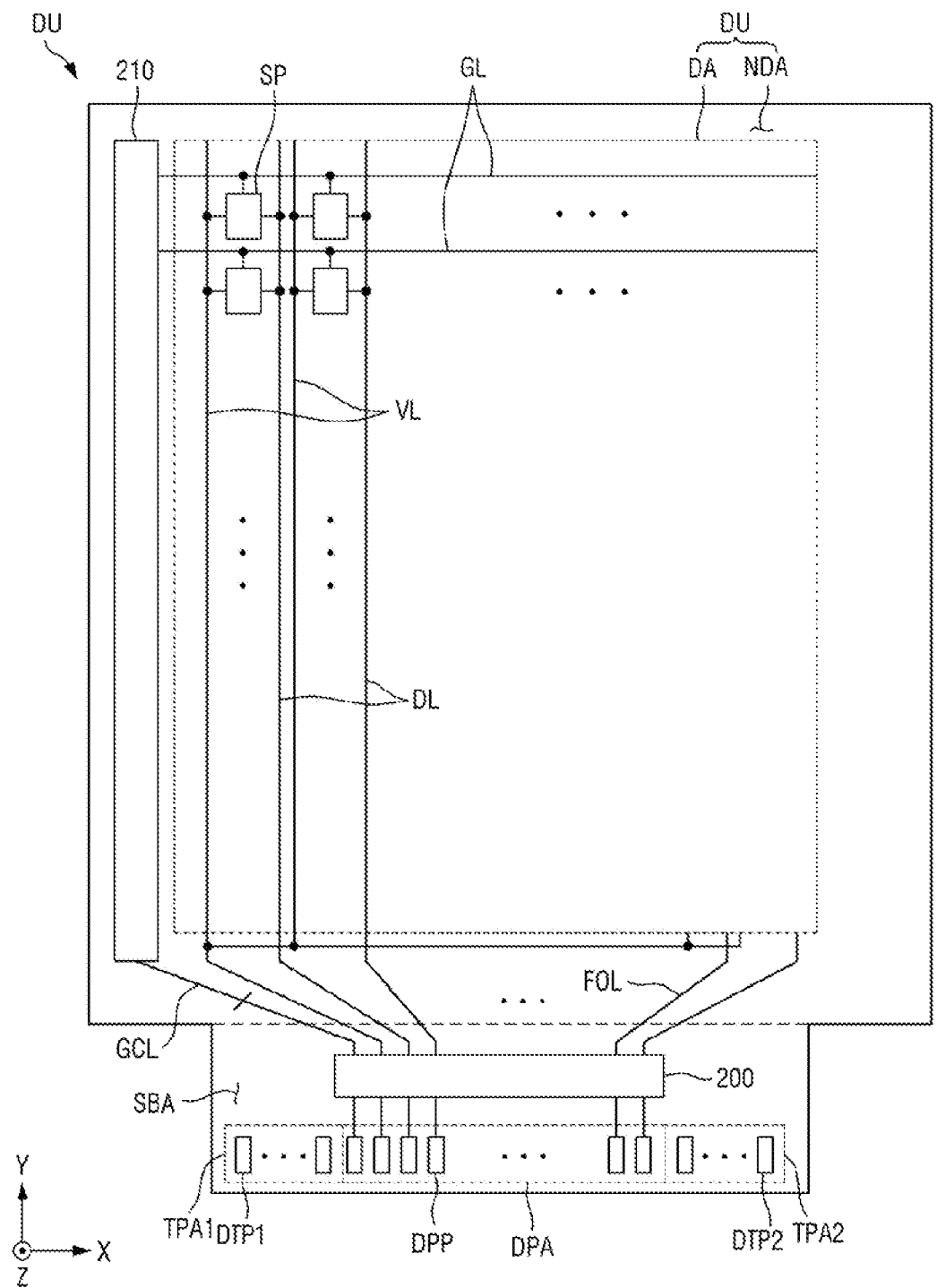
FIG. 5 is a plan view diagram illustrating a display unit of the display device according to an embodiment.

FIG. 5 illustrates a display unit of the display device according to an embodiment.

Referring to FIG. 5, the display area DA of the display unit DU is an area for displaying an image and may be defined as a central area of the display panel 100. The display area DA may include a plurality of pixels SP, a plurality of gate lines GL, a plurality of data lines DL, and a plurality of power lines VL. Each of the plurality of pixels SP may be defined as a minimum unit for outputting light.

The plurality of gate lines GL may supply the gate signal received from the gate driving unit 210 to the plurality of pixels SP. The plurality of gate lines GL may extend in the X-axis direction and may be spaced apart from each other in the Y-axis direction intersecting the X-axis direction.

The plurality of data lines DL may supply the data voltage received from the display driving unit 200 to the plurality of pixels SP. The plurality of data lines DL may extend in the Y-axis direction and may be spaced apart from each other in the X-axis direction.

The plurality of power lines VL may supply the power voltage received from the display driving unit 200 to the plurality of pixels SP. Here, the power voltage may be at least one of a driving voltage, an initialization voltage, and a reference voltage. The plurality of power lines VL may extend in the Y-axis direction and may be spaced apart from each other in the X-axis direction.

The non-display area NDA of the display unit DU may surround the display area DA. The non-display area NDA may include a gate driving unit 210, fan-out lines FOL, and gate control lines GCL. The gate driving unit 210 may generate a plurality of gate signals based on the gate control signal, and may sequentially supply the plurality of gate signals to the plurality of gate lines GL according to a set order.

The fan-out lines FOL may extend from the display driving unit 200 to the display area DA. The fan-out lines FOL may supply the data voltage received from the display driving unit 200 to the plurality of data lines DL.

The gate control line GCL may extend from the display driving unit 200 to the gate driving unit 210. The gate control line GCL may supply the gate control signal received from the display driving unit 200 to the gate driving unit 210.

The sub-area SBA may include a display driving unit 200, a display pad area DPA, and first and second touch pad areas TPA1 and TPA2.

The display driving unit 200 may output signals and voltages for driving the display panel 100 to the fan-out lines FOL. The display driving unit 200 may supply the data voltage to the data lines DL through the fan-out lines FOL. The data voltage may be supplied to the plurality of pixels SP and may determine luminance of the plurality of pixels SP. The display driving unit 200 may supply the gate control signal to the gate driving unit 210 through the gate control line GCL.

The display pad area DPA, the first touch pad area TPA1, and the second touch pad area TPA2 may be disposed at an edge of the sub-area SBA. The display pad area DPA, the first touch pad area TPA1, and the second touch pad area TPA2 may be electrically connected to the circuit board 300 using an anisotropic conductive film or a low-resistance and high-reliability material such as SAP.

The display pad area DPA may include a plurality of display pad portions DPP. The plurality of display pad portions DPP may be connected to the main processor 500 through the circuit board 300. The plurality of display pad portions DPP may be connected to the circuit board 300 to receive digital video data, and may supply the digital video data to the display driving unit 200.

Figure 6:
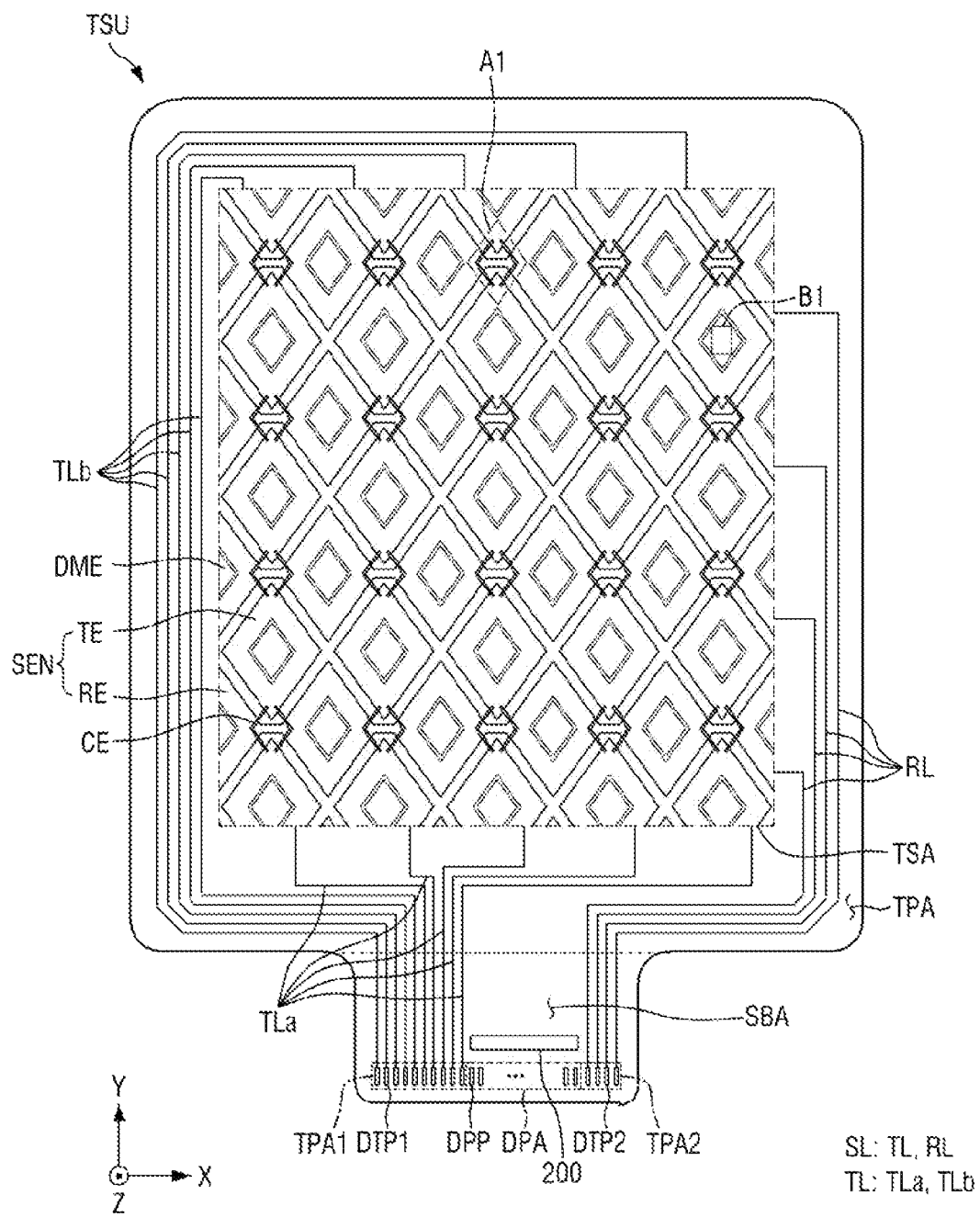
FIG. 6 is a plan view diagram illustrating a touch sensing unit of the display device according to an embodiment.

FIG. 6 illustrates a touch sensing unit of the display device according to an embodiment.

Referring to FIG. 6, the touch sensing unit TSU may include a touch sensor area TSA for sensing a user's touch, and a touch peripheral area TPA disposed around the touch sensor area TSA. The touch sensor area TSA may overlap the display area DA of the display unit DU, and the touch peripheral area TPA may overlap the non-display area NDA of the display unit DU.

The touch sensor area TSA may include a plurality of touch electrodes SEN and a plurality of dummy electrodes DE. The plurality of touch electrodes SEN may form mutual capacitance or self-capacitance to sense a touch of an object or a person. The plurality of touch electrodes SEN may include a plurality of driving electrodes TE and a plurality of sensing electrodes RE.

The plurality of driving electrodes TE may be arranged in the X-axis direction and the Y-axis direction. The plurality of driving electrodes TE may be spaced apart from each other in the X-axis direction and the Y-axis direction. The driving electrodes TE adjacent to each other in the Y-axis direction may be electrically connected to each other through a plurality of connection electrodes CE.

The plurality of driving electrodes TE may be connected to a first touch pad portion DTP1 through a driving line TL. The driving line TL may include a lower driving line TLa and an upper driving line TLb. For example, some of the driving electrodes TE disposed on a lower side of the touch sensor area TSA may be connected to the first touch pad portion DTP1 through the lower driving line TLa, and other driving electrodes TE disposed on an upper side of the touch sensor area TSA may be connected to the first touch pad portion DTP1 through the upper driving line TLb. The lower driving line TLa may pass through a lower side of the touch peripheral area TPA and extend to the first touch pad portion DTP1. The upper driving line TLb may extend to the first touch pad portion DTP1 via upper, left, and lower sides of the touch peripheral area TPA. The first touch pad portion DTP1 may be connected to the touch driving unit 400 through the circuit board 300.

The connection electrode CE may be bent at least once. For example, the connection electrode CE may have a clamp shape ("<" or ">"), but the shape of the connection electrode CE in plan view is not limited thereto. The driving electrodes TE adjacent to each other in the Y-axis direction may be electrically connected to each other by the plurality of connection electrodes CE, and even if any one of the plurality of connection electrodes CE is disconnected, the driving electrodes TE may be stably connected to each other through the remaining connection electrodes CE. The driving electrodes TE adjacent to each other may be connected by two connection electrodes CE, but the number of connection electrodes CE is not limited thereto.

The connection electrodes CE may be disposed on a layer different from that of the plurality of driving electrodes TE and the plurality of sensing electrodes RE. The sensing electrodes RE adjacent to each other in the X-axis direction may be electrically connected to each other through a connection portion disposed on the same layer as the plurality of driving electrodes TE or the plurality of sensing electrodes RE. That is, the plurality of sensing electrodes RE may extend in the X-axis direction and may be spaced apart from each other in the Y-axis direction. The plurality of sensing electrodes RE may be arranged in the X-axis direction and the Y-axis direction, and the sensing electrodes RE adjacent to each other in the X-axis direction may be electrically connected to each other through the connection portion.

The driving electrodes TE adjacent to each other in the Y-axis direction may be electrically connected to each other through the connection electrodes CE disposed on different layers from the plurality of driving electrodes TE or the plurality of sensing electrodes RE. The connection electrodes CE may be formed on a rear layer (or a lower layer) of a layer on which the driving electrodes TE and the sensing electrodes RE are formed. The connection electrodes CE are electrically connected to the respective driving electrodes TE adjacent to the connection electrodes CE through a plurality of contact holes. Accordingly, even if the connection electrodes CE overlap the plurality of sensing electrodes RE in the Z-axis direction, the plurality of driving electrodes TE and the plurality of sensing electrodes RE may be insulated from each other. Mutual capacitance may be formed between the driving electrode TE and the sensing electrode RE.

The plurality of sensing electrodes RE may be connected to a second touch pad portion TP2 through a sensing line RL. For example, some of the sensing electrodes RE disposed on the right side of the touch sensor area TSA may be connected to the second touch pad portion TP2 through the sensing line RL. The sensing line RL may extend to the second touch pad portion TP2 via the right and lower sides of the touch peripheral area TPA. The second touch pad portion TP2 may be connected to the touch driving unit 400 through the circuit board 300.

Each of the plurality of dummy electrodes DE may be surrounded by the driving electrode TE or the sensing electrode RE. Each of the plurality of dummy electrodes DE may be spaced apart from and insulated from the driving electrode TE or the sensing electrode RE. Accordingly, the dummy electrode DE may be electrically floating.

The respective grid patterns are formed in such a way that at least one of the plurality of driving electrodes TE, the plurality of sensing electrodes RE, and the plurality of dummy electrodes DE protrudes from the respective grid reference point positions. In addition, a plurality of grid patterns may also be formed to be separated from at least one of the plurality of driving electrodes TE, the plurality of sensing electrodes RE, and the plurality of dummy electrodes DE at the respective grid reference point positions. In addition, code patterns in a shape of a planar code are formed at preset intervals on some areas of the front surface of at least one of the plurality of driving electrodes TE, the plurality of sensing electrodes RE, and the plurality of dummy electrodes DE.

The display pad area DPA, the first touch pad area TPA1, and the second touch pad area TPA2 may be disposed at an edge of the sub-area SBA. The display pad area DPA, the first touch pad area TPA1, and the second touch pad area TPA2 may be electrically connected to the circuit board 300 using an anisotropic conductive film or a low-resistance and high-reliability material such as SAP.

The first touch pad area TPA1 may be disposed on one side of the display pad area DPA and may include a plurality of first touch pad portions DTP1. The plurality of first touch pad portions DTP1 may be electrically connected to the touch driving unit 400 disposed on the circuit board 300. The plurality of first touch pad portions DTP1 may supply a touch driving signal to the plurality of driving electrodes TE through the plurality of driving lines TL.

The second touch pad area TPA2 may be disposed on the other side of the display pad area DPA and may include a plurality of second touch pad portions DTP2. The plurality of second touch pad portions DTP2 may be electrically connected to the touch driving unit 400 disposed on the circuit board 300. The touch driving unit 400 may receive a touch sensing signal through the plurality of sensing lines RL connected to the plurality of second touch pad portions DTP2, and may sense a change in mutual capacitance between the driving electrode TE and the sensing electrode RE.

As an example, the touch driving unit 400 may supply a touch driving signal to each of the plurality of driving electrodes TE and the plurality of sensing electrodes RE, and may receive a touch sensing signal from each of the plurality of driving electrodes TE and the plurality of sensing electrodes RE. The touch driving unit 400 may sense a charge change amount of each of the plurality of driving electrodes TE and the plurality of sensing electrodes RE based on the touch sensing signal.

Figure 7:
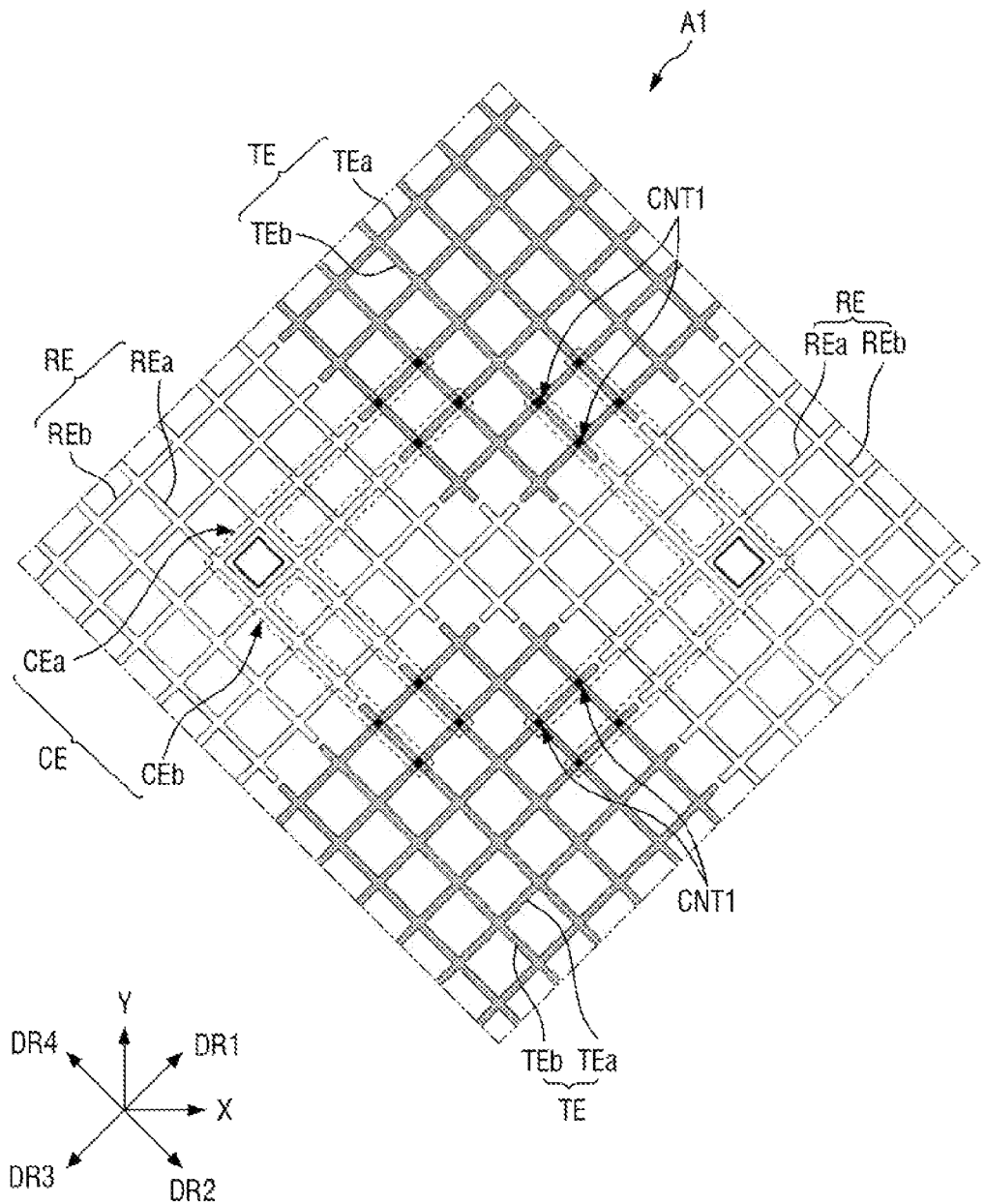
FIG. 7 is an enlarged view diagram illustrating area μl of FIG. 6.

FIG. 7 illustrates area μl of FIG. 6. In addition, FIG. 8 illustrates a structure of a connection portion between a connection electrode and sensing electrodes of FIG. 7.

Figure 8:
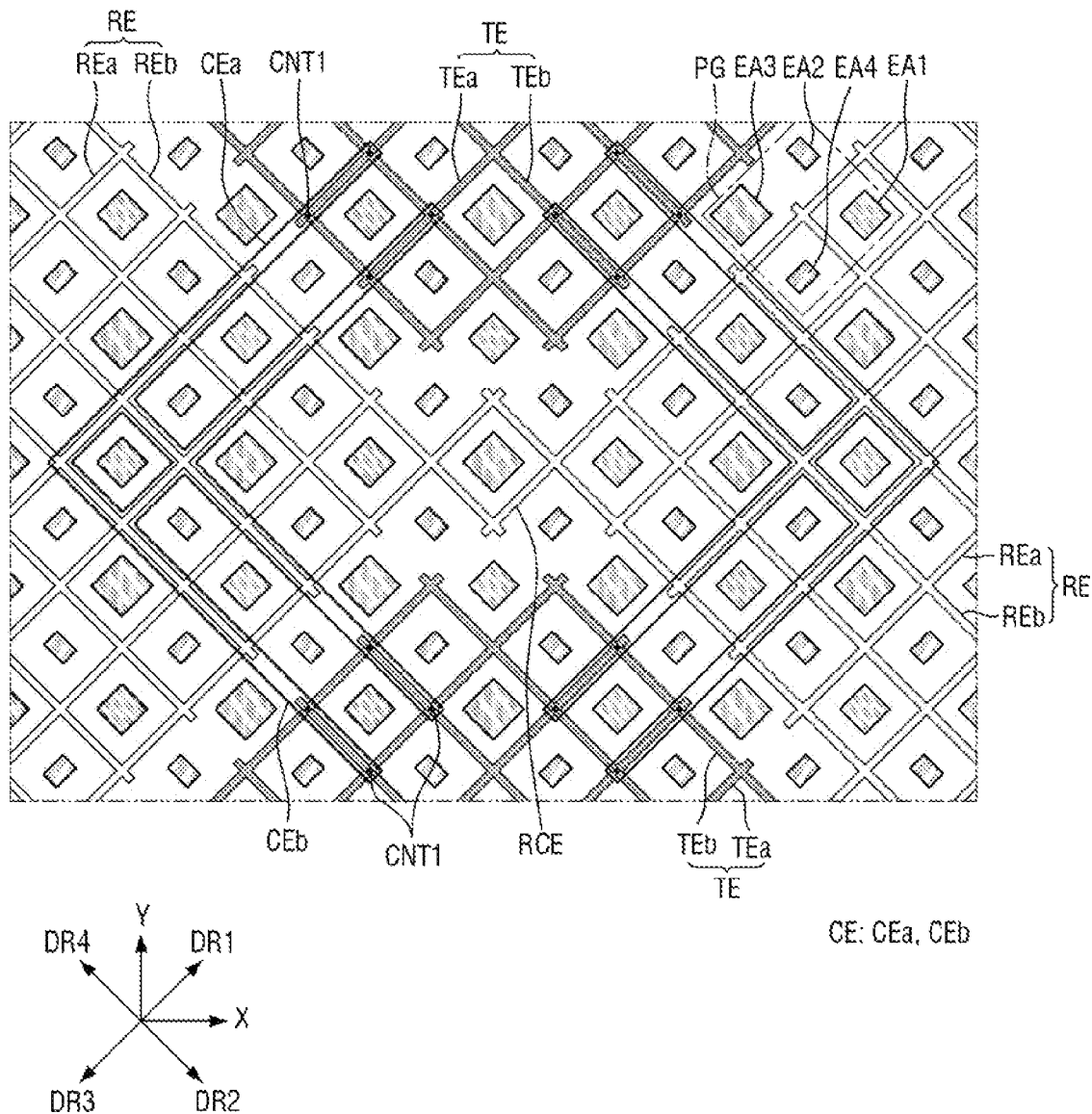
FIG. 8 is an enlarged view diagram illustrating a structure of a connection portion between a connection electrode and sensing electrodes of FIG. 7.

Referring to FIGS. 7 and 8, the plurality of driving electrodes TE, the plurality of sensing electrodes RE, and the plurality of dummy electrodes DE may be disposed on the same layer and may be spaced apart from each other.

The plurality of driving electrodes TE may be arranged in the X-axis direction and the Y-axis direction. The plurality of driving electrodes TE may be spaced apart from each other in the X-axis direction and the Y-axis direction. The driving electrodes TE adjacent to each other in the Y-axis direction may be electrically connected to each other through the connection electrodes CE.

The plurality of sensing electrodes RE may extend in the X-axis direction and may be spaced apart from each other in the Y-axis direction. The plurality of sensing electrodes RE may be arranged in the X-axis direction and the Y-axis direction, and the sensing electrodes RE adjacent to each other in the X-axis direction may be electrically connected to each other. For example, the sensing electrodes RE may be electrically connected to each other through a connection portion, and the connection portion may be disposed within the shortest distance between the driving electrodes TE adjacent to each other.

The plurality of connection electrodes CE may be disposed on a layer different from that of the driving electrode TE and the sensing electrode RE, for example, a rear layer. The connection electrode CE may include a first portion CEa and a second portion CEb. For example, the first portion CEa of the connection electrode CE may be connected to the driving electrode TE disposed on one side through a first contact hole CNT1 to extend in the third direction DR3. The second portion CEb of the connection electrode CE may be bent from the first portion CEa in an area overlapping the sensing electrode RE to extend in the second direction DR2, and may be connected to the driving electrode TE disposed on the other side through the first contact hole CNT1. Hereinafter, the first direction DR1 may refer to a direction between the X-axis direction and the Y-axis direction, the second direction DR2 may refer to a direction between a direction opposite to the Y-axis direction and the X-axis direction, the third direction DR3 may refer to a direction opposite to the first direction DR1, and the fourth direction DR4 may refer to a direction opposite to the second direction DR2. Accordingly, each of the plurality of connection electrodes CE may connect the driving electrodes TE adjacent to each other in the Y-axis direction.

Each pixel group PG may include first to third sub-pixels or first to fourth sub-pixels, and each of the first to fourth sub-pixels may include first to fourth light emitting areas EA1, EA2, EA3, and EA4. For example, the first light emitting area EA1 may emit light of a first color or red light, the second light emitting area EA2 may emit light of a second color or green light, and the third light emitting area EA3 may emit light of a third color or blue light. In addition, the fourth light emitting area EA4 may emit light of a fourth color or light of any one of the first to third colors, but is not limited thereto.

One pixel group PG may express a white grayscale through the first to third light emitting areas EA1 to EA3 or the first to fourth light emitting areas EA1 to EA4. In addition, grayscales of various colors, such as white, may be expressed by a combination of light emitted from the first to third light emitting areas EA1 to EA3 or the first to fourth light emitting areas EA1 to EA4.

According to an arrangement structure of the first to third sub-pixels or the first to fourth sub-pixels, the plurality of driving electrodes TE, the plurality of sensing electrodes RE, and the plurality of dummy electrodes DE may be formed in a mesh structure or a net structure in plan view.

The plurality of driving electrodes TE, the plurality of sensing electrodes RE, and the plurality of dummy electrodes DE may surround between and around the first to third light emitting areas EA1 to EA3 or the first to fourth light emitting areas EA1 to EA4 included in the pixel group PG in plan view. Therefore, the plurality of driving electrodes TE, the plurality of sensing electrodes RE, and the plurality of dummy electrodes DE need not overlap the first to fourth light emitting areas EA1 to EA4. The plurality of connection electrodes CE may also not overlap the first to fourth light emitting areas EA1 to EA4. Therefore, the display device 10 may prevent luminance of the light emitted from the first to fourth light emitting areas EA1 to EA4 from being reduced by the touch sensing unit TSU.

Each of the plurality of driving electrodes TE may be formed to include a first portion TEa extending in the first direction DR1 and a second portion TEb extending in the second direction DR2 and need not overlap the first to fourth light emitting areas EA1 to EA4. In addition, each of the plurality of sensing electrodes RE may be formed to include a first portion REa extending in the first direction DR1 and a second portion REb extending in the second direction DR2 and need not overlap the first to fourth light emitting areas EA1 to EA4. The plurality of dummy electrodes DE are also formed not overlap the first to fourth light emitting areas EA1 to EA4.

Figure 9:
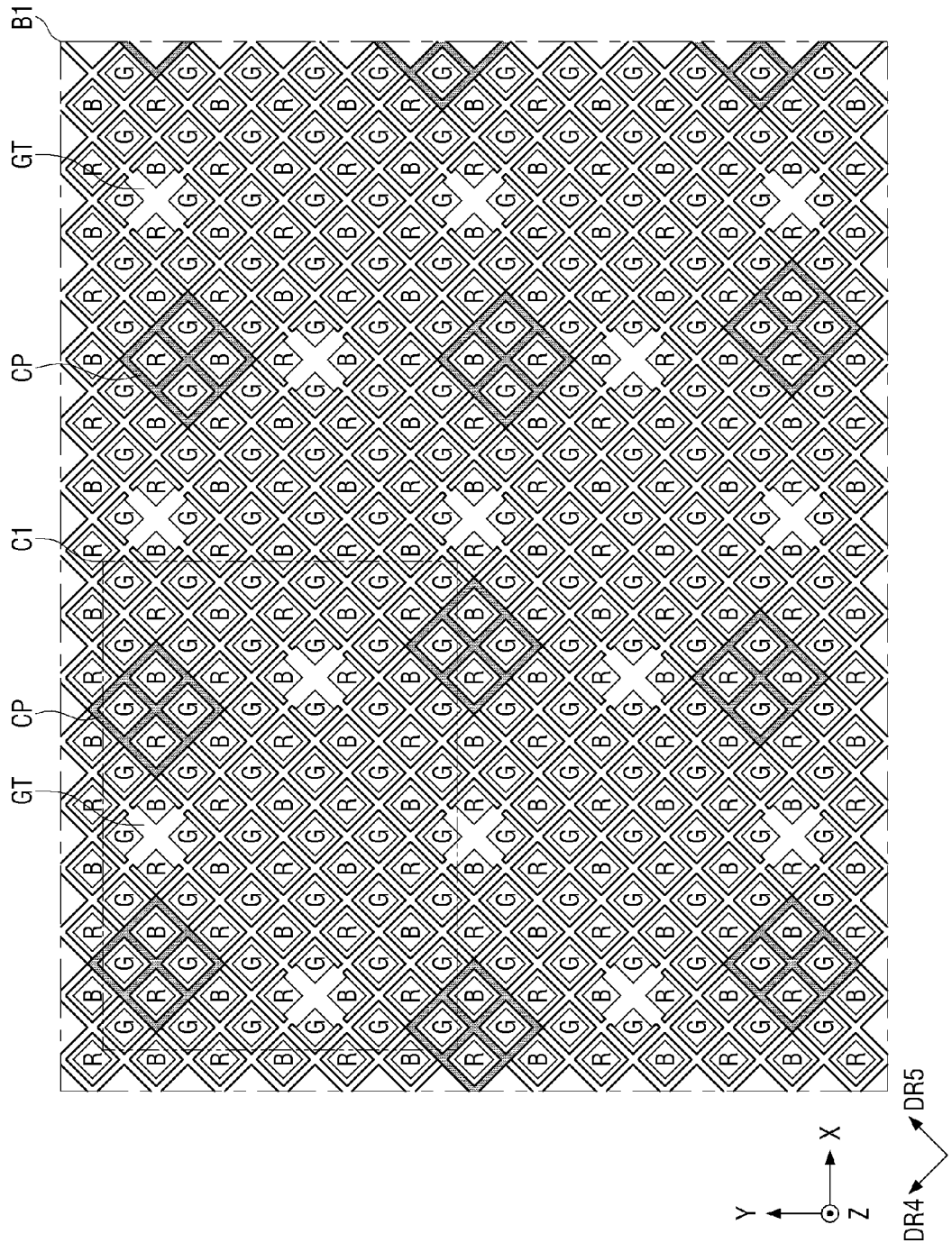
FIG. 9 is an enlarged view diagram illustrating an arrangement structure of grid patterns and code patterns formed in area B1 of FIG. 6 according to an embodiment.

FIG. 9 illustrates an arrangement structure of grid patterns and code patterns formed in area B1 of FIG. 6 according to an embodiment. In addition, FIG. 10 illustrates area C1 of FIG. 9.

Referring to FIGS. 9 and 10, a plurality of grid patterns GT are patterns serving as grid reference points of grid reference lines formed in the touch input device 20, and may be integrally formed with the plurality of dummy electrodes DE, the plurality of driving electrodes TE, and the plurality of sensing electrodes RE.

The plurality of grid patterns GT may be formed to protrude from the plurality of dummy electrodes DE, the plurality of driving electrodes TE, and the plurality of sensing electrodes RE in at least one direction at the grid reference point positions with a predetermined interval (e.g., an interval of about 300 μm). For example, a width or an extent of each of the grid patterns GT in at least one of horizontal (e.g., X-axis direction), vertical (e.g., Y-axis direction), and diagonal directions (e.g., DR4 to DR5 axis directions) in plan view may be greater than a width of each of the dummy electrodes DE, the driving electrodes TE, and the sensing electrodes RE. Accordingly, infrared light reflectivity of each of the grid patterns GT may be higher than the infrared light reflectivity of each of the dummy electrodes DE, the driving electrodes TE, and the sensing electrodes RE.

As shown in FIG. 10, when each grid pattern GT formed with the width wider than the width of the dummy electrodes DE, the driving electrodes TE, and the sensing electrodes RE is disposed between the light emitting areas, respectively, a planar shape of each of the grid patterns GT may be formed in a polygonal shape, a circle shape, or an elliptical shape between the light emitting areas adjacent to each other. Alternatively, when each grid pattern GT is formed in a shape surrounding around at least one light emitting area, the planar shape of each grid pattern GT may also be formed in a closed loop shape such as a rectangle, a square, a circle, or a rhombus that surrounds around at least one light emitting area. In addition, when each grid pattern GT is formed in a shape surrounding between and around the plurality of light emitting areas, the planar shape of each grid pattern GT may be formed of a mesh structure and a net structure surrounding between and around the plurality of light emitting areas.

The plurality of code patterns CP are formed at predetermined intervals (e.g., intervals of about 300 μm) in some areas of the front surfaces of the plurality of dummy electrodes DE, the plurality of driving electrodes TE, and the plurality of sensing electrodes RE. The plurality of code patterns CP may be respectively formed between the plurality of grid patterns GT so as not to overlap the plurality of grid patterns GT, respectively.

The code patterns CP are formed of light blocking members made of a material that absorbs light, and each of the light blocking members is formed by covering some areas of the front surface of at least one of the plurality of driving electrodes TE, the plurality of sensing electrodes RE, and the plurality of dummy electrodes DE with a planar code shape having a preset size. In this case, the light blocking member may be formed by covering some areas of the front surfaces of the respective electrodes, but also at least one side surface along with the front surfaces.

The planar code shape of the code patterns CP may be formed in a mesh structure and a net structure in plan view by surrounding between and around the plurality of light emitting areas, not one light emitting area. Alternatively, the planar code shape of the code patterns CP may be formed in a closed loop shape such as a rectangle, a square, a circle, or a rhombus by surrounding around at least one light emitting area. Alternatively, the planar code shape of the code patterns CP may also be formed in an open loop shape that surrounds a portion of at least one light emitting area. In this case, the planar code shape of the code patterns CP may also be formed in a shape of a straight line or a curve having a preset length. Hereinafter, an example in which the planar shape of the code patterns CP is formed in a mesh structure in plan view by surrounding between and around the plurality of light emitting areas will be described.

Figure 11:
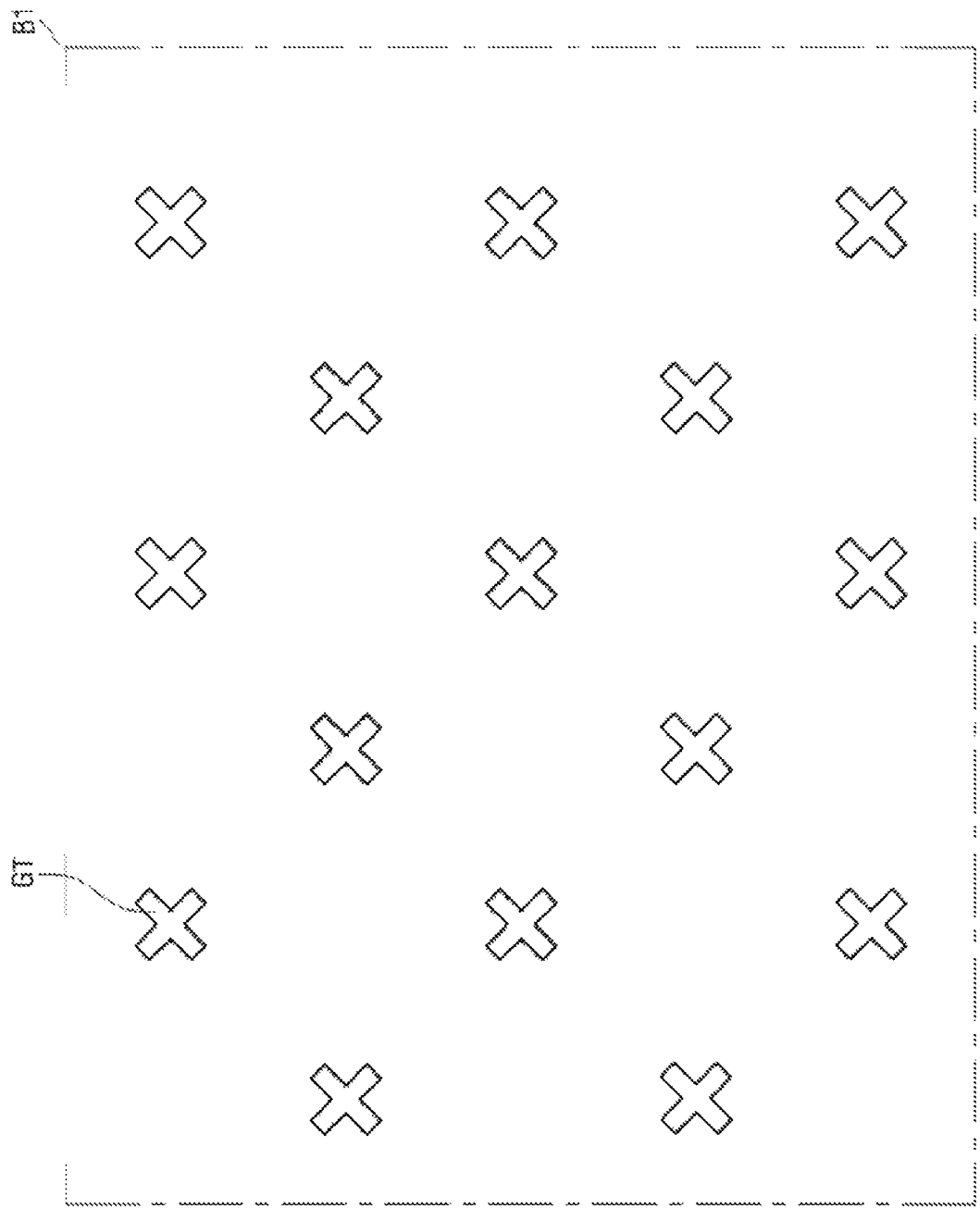
FIG. 11 is a top view diagram illustrating detection shapes and arrangement positions of the grid patterns shown in FIG. 9.

FIG. 11 illustrates detection shapes and arrangement positions of the grid patterns shown in FIG. 9.

Referring to FIG. 11, the code detection unit 21 of the touch input device 20 emits infrared light to the display panel 100, and detects infrared light reflected from the touch electrodes SEN, the grid patterns GT, and the code patterns CP. The code detection unit 21 may detect a shape image and shape data for the grid patterns GT and the code patterns CP from an optical image formed in response to the amount of infrared light reflected from the touch electrodes SEN, the grid patterns GT, and the code patterns CP.

The code detection unit 21 detects a shape image and shape data for the grid patterns GT from the optical image. For example, the code detection unit 21 detects the shapes and arrangement positions of the grid patterns GT having the highest infrared light reflectivity and thus having a large amount of infrared light among the touch electrodes SEN, the grid patterns GT, and the code patterns CP from the optical image, and provides the shape data for the grid patterns GT to the code processor 23.

The code detection unit 21 of the touch input device 20 may continuously detect the grid patterns GT according to the user's control and movement, and may continuously generate shape data including shape and position information of the grid patterns GT and provide the shape data to the code processor 23.

Figure 12:
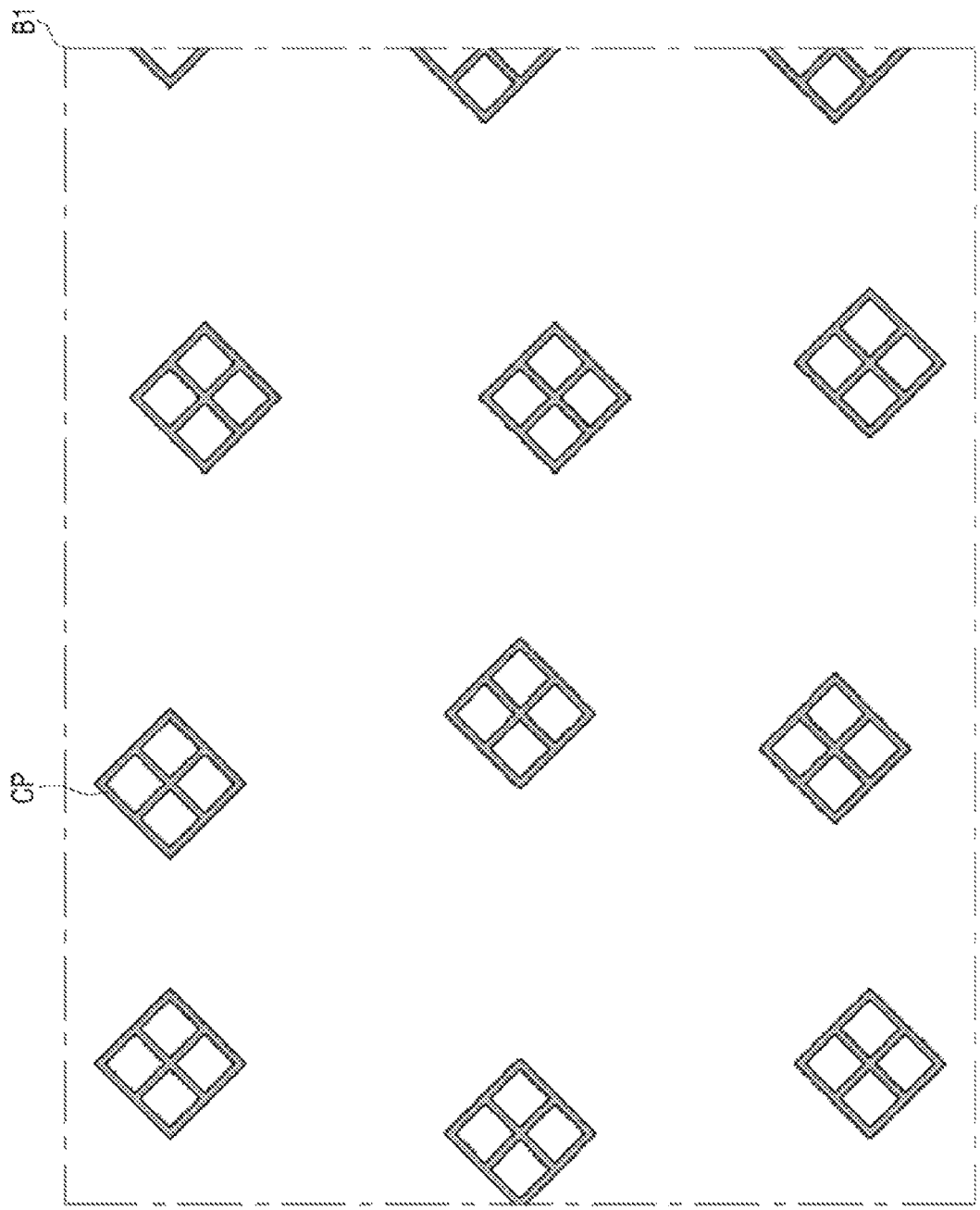
FIG. 12 is a top view diagram illustrating detection shapes and arrangement positions of the code patterns shown in FIG. 9.

FIG. 12 illustrates detection shapes and arrangement positions of the code patterns shown in FIG. 9.

Referring to FIG. 12, the code detection unit 21 may detect a shape image and shape data for the code patterns CP from an optical image formed in response to the amount of infrared light reflected from the touch electrodes SEN, the grid patterns GT, and the code patterns CP.

For example, the code detection unit 21 detects the shapes and arrangement positions of the code patterns CT having the lowest infrared light reflectivity and thus having a small amount of infrared light among the touch electrodes SEN, the grid patterns GT, and the code patterns CP from the optical image, and provides shape data for the code patterns CT to the code processor 23.

The code detection unit 21 of the touch input device 20 may continuously detect the code patterns CP according to the user's control and movement, and may continuously generate shape data including shape and position information of the code patterns CP and provide the shape data to the code processor 23.

Figure 13:
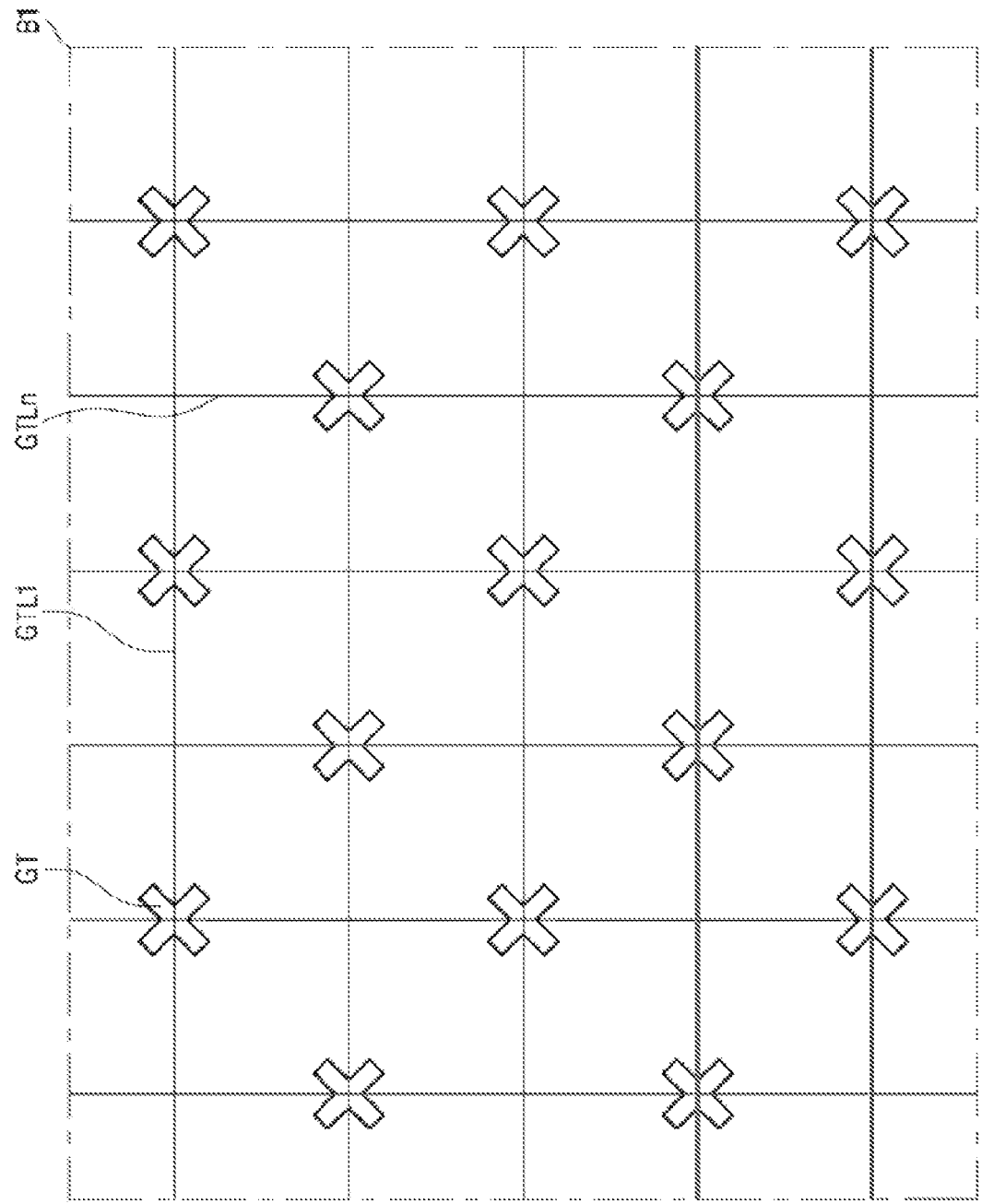
FIG. 13 is a top view diagram for describing a method of forming a plurality of grid reference lines according to the arrangement positions of the grid patterns shown in FIG. 11.

FIG. 13 is used for describing a method of forming a plurality of grid reference lines according to the arrangement positions of the grid patterns shown in FIG. 11. In addition, FIG. 14 is used for describing a method of detecting touch position coordinates according to a result of comparing the plurality of grid reference lines and the arrangement positions of the code patterns shown in FIG. 13.

Figure 14:
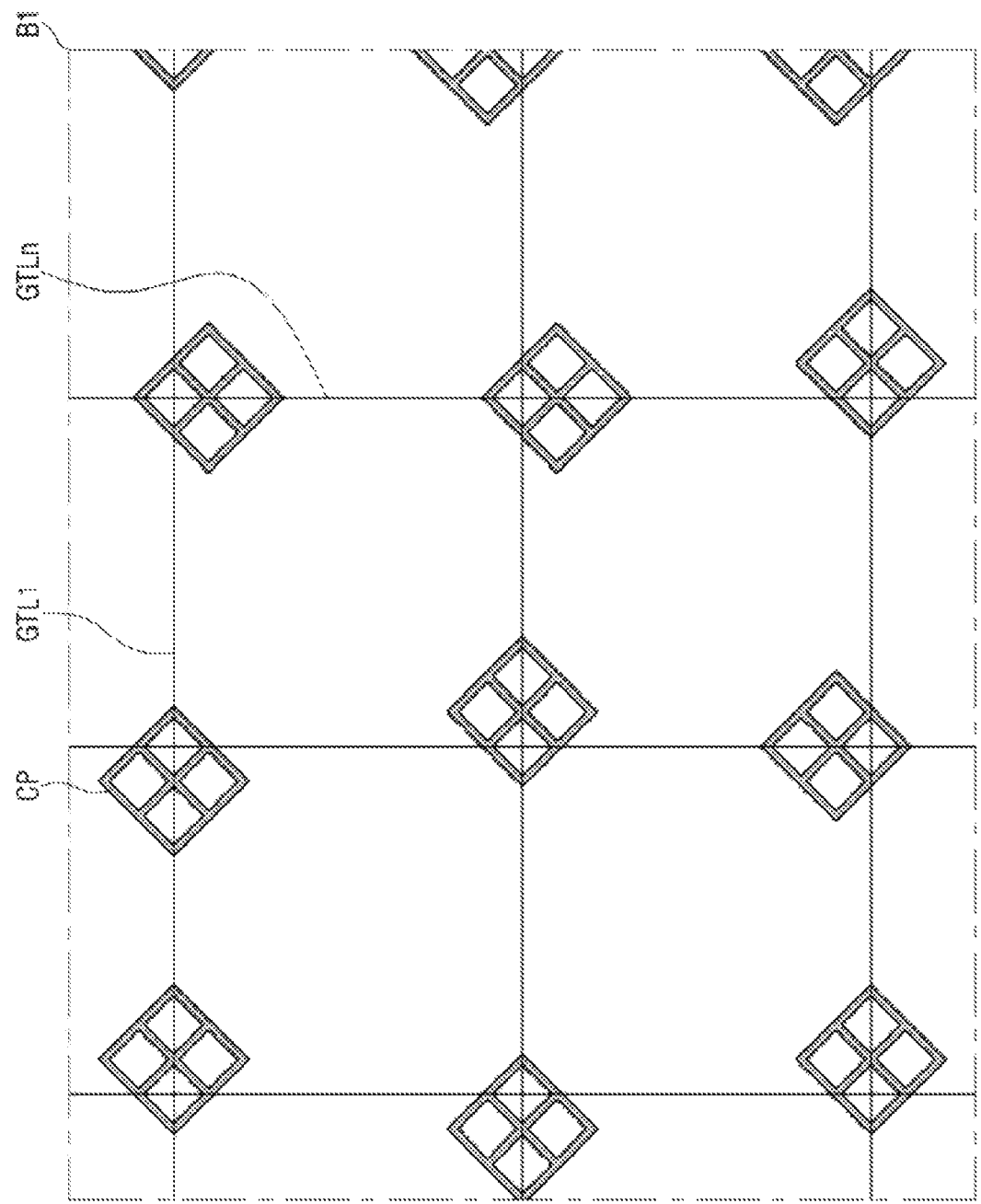
FIG. 14 is a top view diagram for describing a method of detecting touch position coordinates according to a result of comparing the plurality of grid reference lines and the arrangement positions of the code patterns shown in FIG. 13.

Referring to FIGS. 13 and 14, the code processor 23 continuously receives the shape data of the grid patterns GT and the code patterns CP from the code detection unit 21. In addition, the code processor 23 extracts or generates coordinate data by identifying the shape and arrangement structure of the grid patterns GT and the code patterns CP, respectively.

For example, the code processor 23 may generate a plurality of grid reference lines GTL1 to GTLn by connecting the arrangement positions of the grid patterns GT with a straight line based on the arrangement positions of the grid patterns GT included in the shape data of the grid patterns GT.

As shown in FIG. 14, the code processor 23 matches and compares the plurality of grid reference lines GTL1 to GTLn with the shape data of the code patterns CP. In this case, the code processor 23 matches and compares the plurality of grid reference lines GTL1 to GTLn with the arrangement positions of the code patterns CP. In addition, the code processor 23 may extract touch position coordinates and coordinate data according to a comparison result by matching and comparing a shape image or shape data of the matching and comparison result with a shape image or shape data of the arrangement position comparison result stored in the memory 25.

The code processor 23 transmits the coordinate data including the touch position coordinates to the display device 10 through the communication module 24. In this way, the code processor 23 may quickly generate the coordinate data in real time without complicated calculation and correction by continuously generating the touch position coordinates and the coordinate data corresponding to a shape of the result of comparing the plurality of grid reference lines GTL1 to GTLn and the arrangement positions of the code patterns CP.

Figure 15:
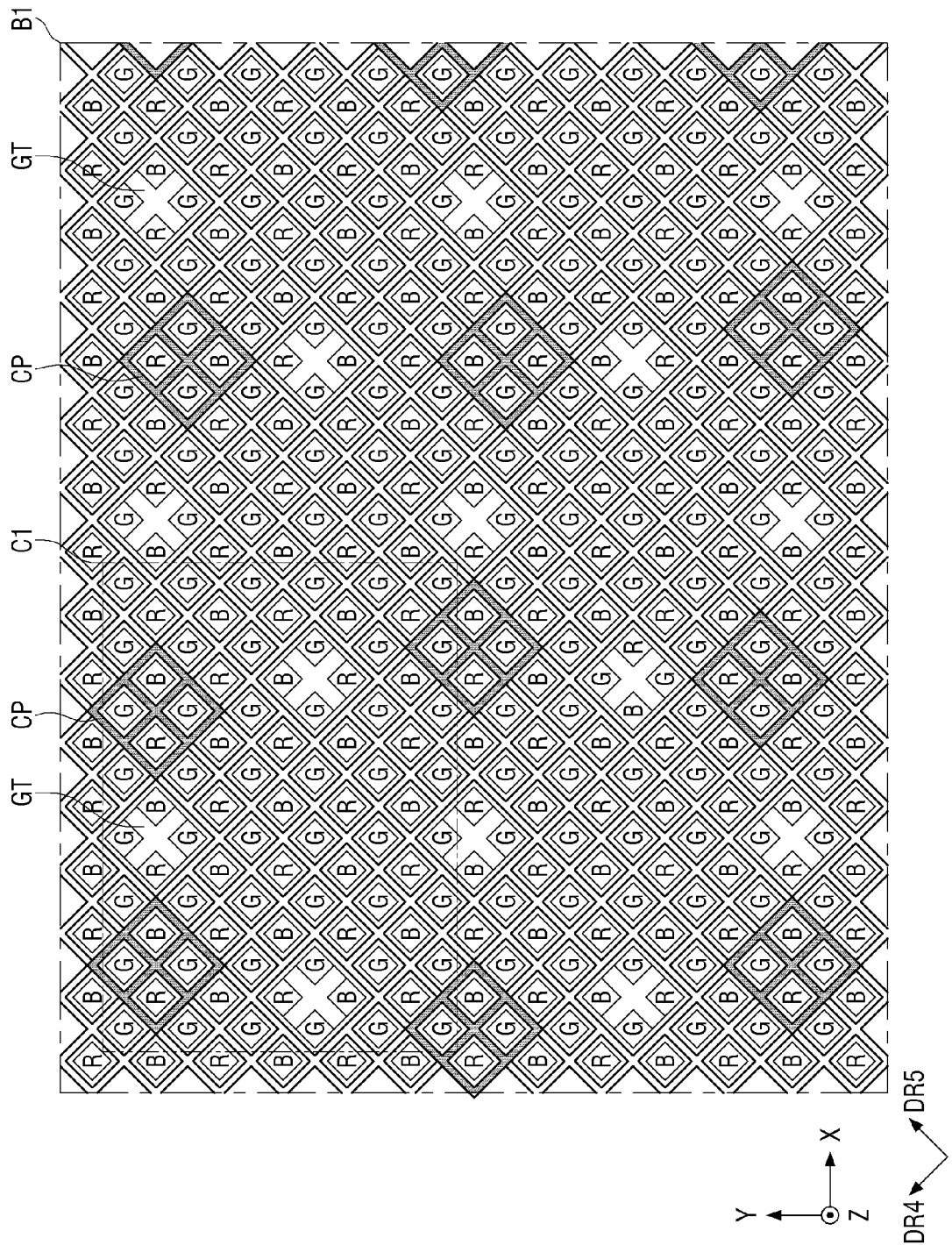
FIG. 15 is an enlarged view diagram illustrating an arrangement structure of grid patterns and code patterns formed in area B1 of FIG. 6 according to an embodiment.

FIG. 15 illustrates an arrangement structure of grid patterns and code patterns formed in area B1 of FIG. 6 according to an embodiment. In addition, FIG. 16 illustrates area C1 of FIG. 15.

Referring to FIGS. 15 and 16, the plurality of grid patterns GT may be formed in the form of island separated from the plurality of dummy electrodes DE, the plurality of driving electrodes TE, and the plurality of sensing electrodes RE at the grid reference point positions with a predetermined interval (e.g., an interval of about 300 μm).

A width or an extent of each of the plurality of grid patterns GT in at least one of horizontal (e.g., X-axis direction), vertical (e.g., Y-axis direction), and diagonal directions (e.g., DR4 to DR5 axis directions) in plan view may be greater than a width of each of the dummy electrodes DE, the driving electrodes TE, and the sensing electrodes RE. Accordingly, infrared light reflectivity of each of the grid patterns GT may be higher than the infrared light reflectivity of each of the dummy electrodes DE, the driving electrodes TE, and the sensing electrodes RE.

As shown in FIG. 16, when each grid pattern GT formed with the width wider than the width of the dummy electrodes DE, the driving electrodes TE, and the sensing electrodes RE is disposed between the light emitting areas, respectively, a planar shape of each of the grid patterns GT may be formed in a polygonal shape, a circle shape, or an elliptical shape between the light emitting areas adjacent to each other. Alternatively, when each grid pattern GT is formed in a shape surrounding around at least one light emitting area, the planar shape of each grid pattern GT may also be formed in a closed loop shape such as a rectangle, a square, a circle, or a rhombus that surrounds around at least one light emitting area. In addition, when each grid pattern GT is formed in a shape surrounding between and around the plurality of light emitting areas, the planar shape of each grid pattern GT may be formed of a mesh structure and a net structure surrounding between and around the plurality of light emitting areas.

The plurality of code patterns CP may be respectively formed between the plurality of grid patterns GT so as not to overlap the plurality of grid patterns GT, respectively.

The plurality of code patterns CP may be formed of light blocking members made of a material that absorbs light, and each of the code patterns CP may be formed to have the same formation width as a front width of at least one of the plurality of driving electrodes TE, the plurality of sensing electrodes RE, and the plurality of dummy electrodes DE. In this case, the plurality of code patterns CP cover some areas of a front surface of at least one of the plurality of driving electrodes TE, the plurality of sensing electrodes RE, and the plurality of dummy electrodes DE.

Each of the code patterns CP may be formed to have the same formation width as the widths of the front and side surfaces of at least one of the plurality of driving electrodes TE, the plurality of sensing electrodes RE, and the plurality of dummy electrodes DE. In this case, the plurality of code patterns CP cover some areas of the front and side surfaces of at least one of the plurality of driving electrodes TE, the plurality of sensing electrodes RE, and the plurality of dummy electrodes DE.

Figure 17:
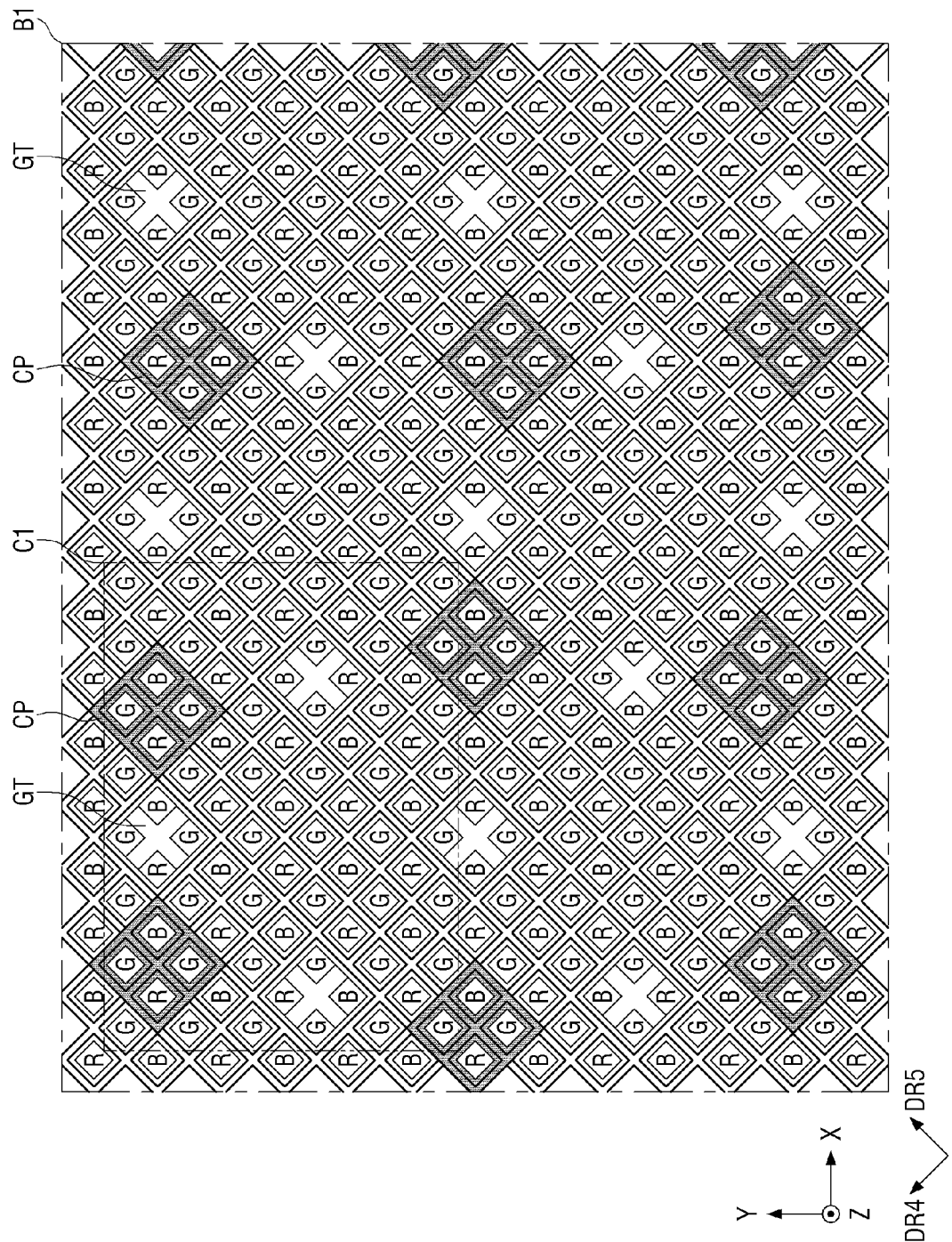
FIG. 17 is an enlarged view illustrating an arrangement structure of grid patterns and code patterns formed in area B1 of FIG. 6 according to an embodiment.

FIG. 17 illustrates an arrangement structure of grid patterns and code patterns formed in area B1 of FIG. 6 according to an embodiment. In addition, FIG. 18 illustrates area C1 of FIG. 17.

Referring to FIGS. 17 and 18, the plurality of code patterns CP may be respectively formed between the plurality of grid patterns GT so as not to overlap the plurality of grid patterns GT, respectively.

Each of the code patterns CP may be formed to have a wider formation width than the widths of the front and side surfaces of at least one of the plurality of driving electrodes TE, the plurality of sensing electrodes RE, and the plurality of dummy electrodes DE. In this case, the plurality of code patterns CP may be formed to further cover a portion of light emitting areas adjacent to each other, as well as the front and side surfaces of at least one of the plurality of driving electrodes TE, the plurality of sensing electrodes RE, and the plurality of dummy electrodes DE.

The planar code shape of the code patterns CP may be formed in a mesh structure and a net structure in plan view by surrounding between and around the plurality of light emitting areas, not one light emitting area. Alternatively, the planar code shape of the code patterns CP may be formed in a closed loop shape such as a rectangle, a square, a circle, or a rhombus by surrounding around at least one light emitting area. Alternatively, the planar code shape of the code patterns CP may also be formed in an open loop shape that surrounds a portion of at least one light emitting area. In this case, the planar code shape of the code patterns CP may also be formed in a shape of a straight line or a curve having a preset length.

Figure 19:
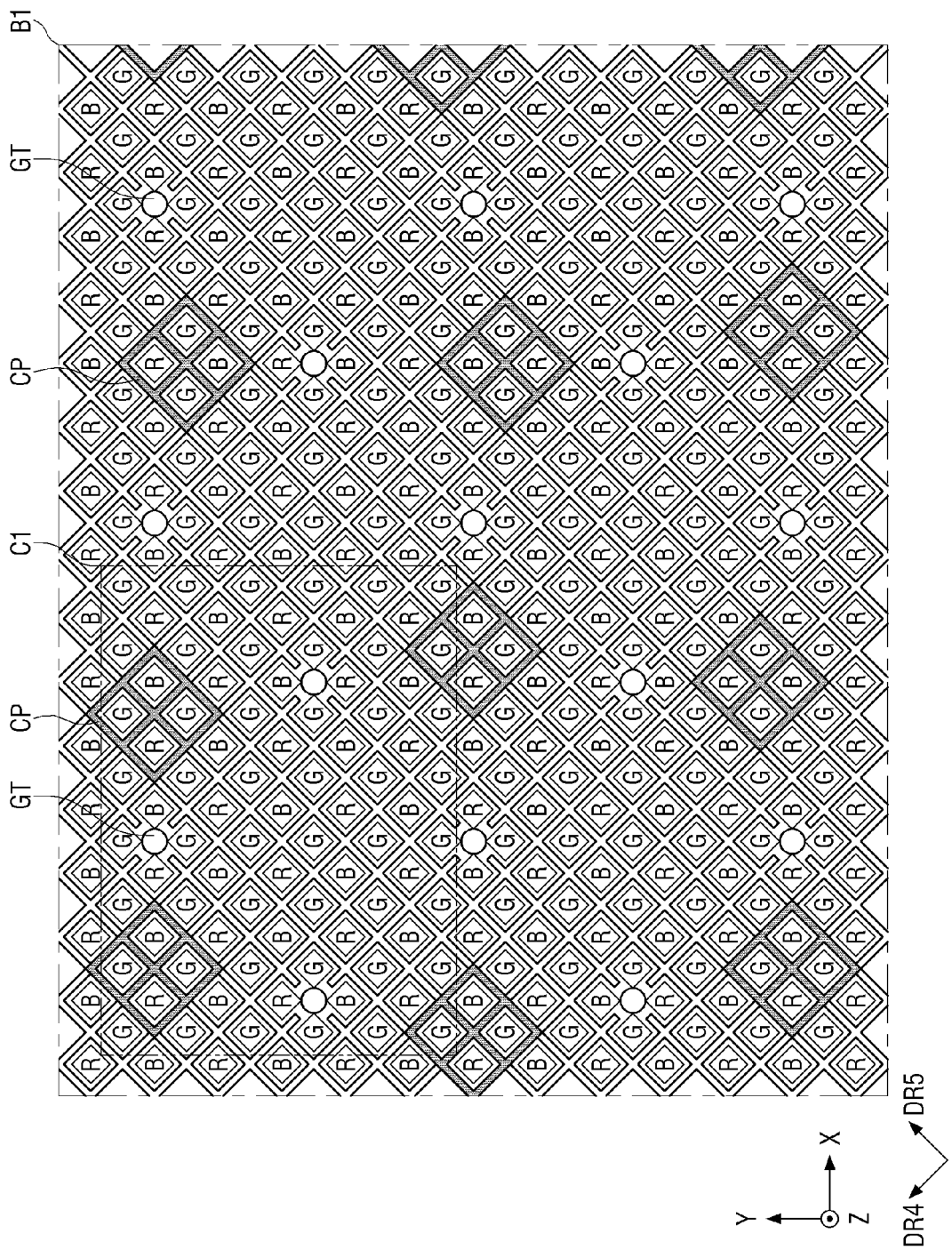
FIG. 19 is an enlarged view diagram illustrating an arrangement structure of grid patterns and code patterns formed in area B1 of FIG. 6 according to an embodiment.

FIG. 19 illustrates an arrangement structure of grid patterns and code patterns formed in area B1 of FIG. 6 according to an embodiment. In addition, FIG. 20 is a top view diagram illustrating detection shapes and arrangement positions of the grid patterns shown in FIG. 19.

Figure 20:
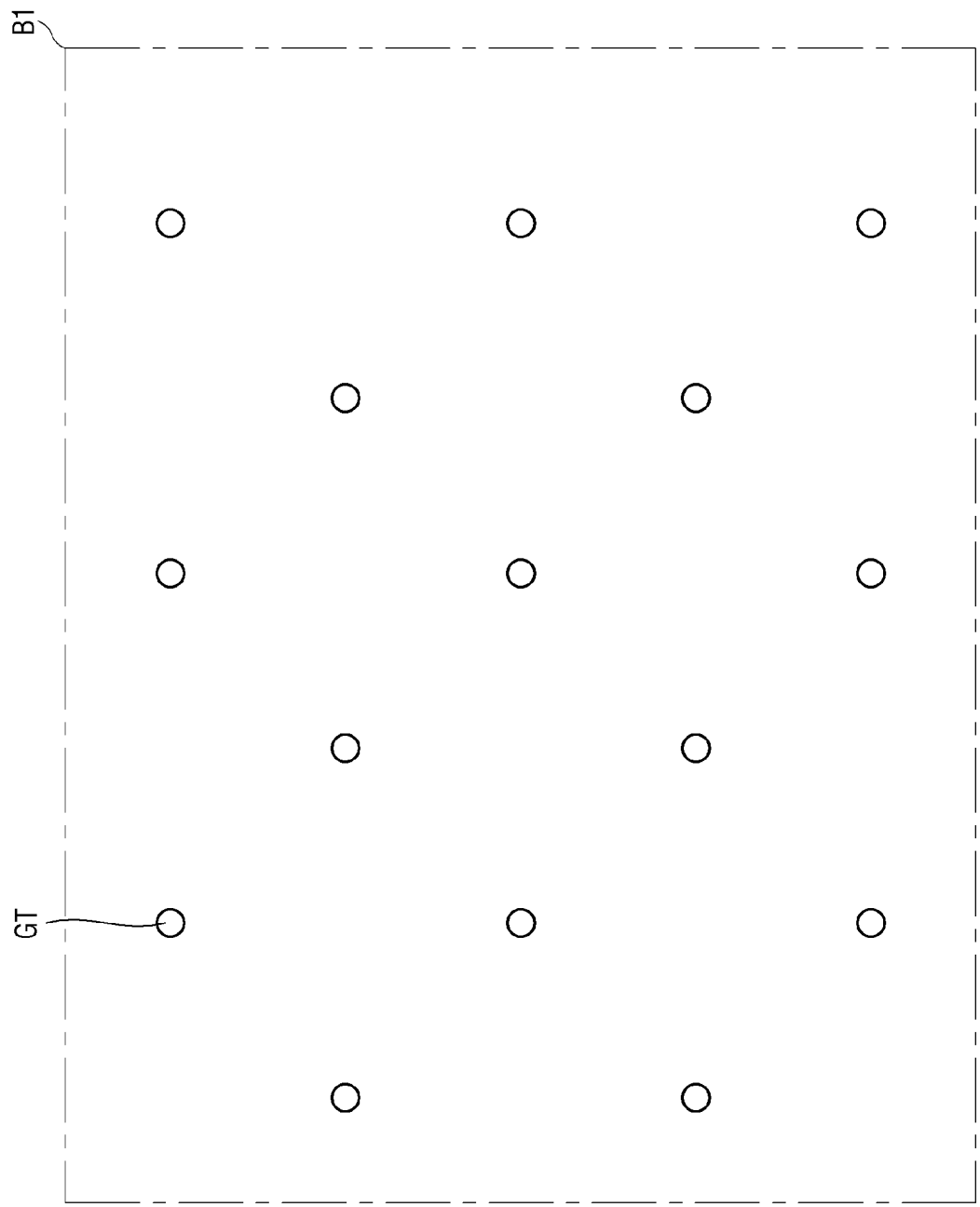
FIG. 20 is a top view diagram illustrating detection shapes and arrangement positions of the grid patterns shown in FIG. 19.

Referring to FIGS. 19 and 20, the plurality of grid patterns GT may be formed in the form of islands separated from the plurality of dummy electrodes DE, the plurality of driving electrodes TE, and the plurality of sensing electrodes RE at the grid reference point positions with a predetermined interval (e.g., an interval of about 300 μm).

A width or an extent of each of the plurality of grid patterns GT in at least one of horizontal (e.g., X-axis direction), vertical (e.g., Y-axis direction), and diagonal directions (e.g., DR4 to DR5 axis directions) in plan view may be greater than a width of each of the dummy electrodes DE, the driving electrodes TE, and the sensing electrodes RE. Accordingly, infrared light reflectivity of each of the grid patterns GT may be higher than the infrared light reflectivity of each of the dummy electrodes DE, the driving electrodes TE, and the sensing electrodes RE.

As shown in FIGS. 19 and 20, when each grid pattern GT formed with the width wider than the width of the dummy electrodes DE, the driving electrodes TE, and the sensing electrodes RE is disposed between the light emitting areas, respectively, a planar shape of each of the grid patterns GT may be formed in a circle shape between the light emitting areas adjacent to each other.

Figure 21:
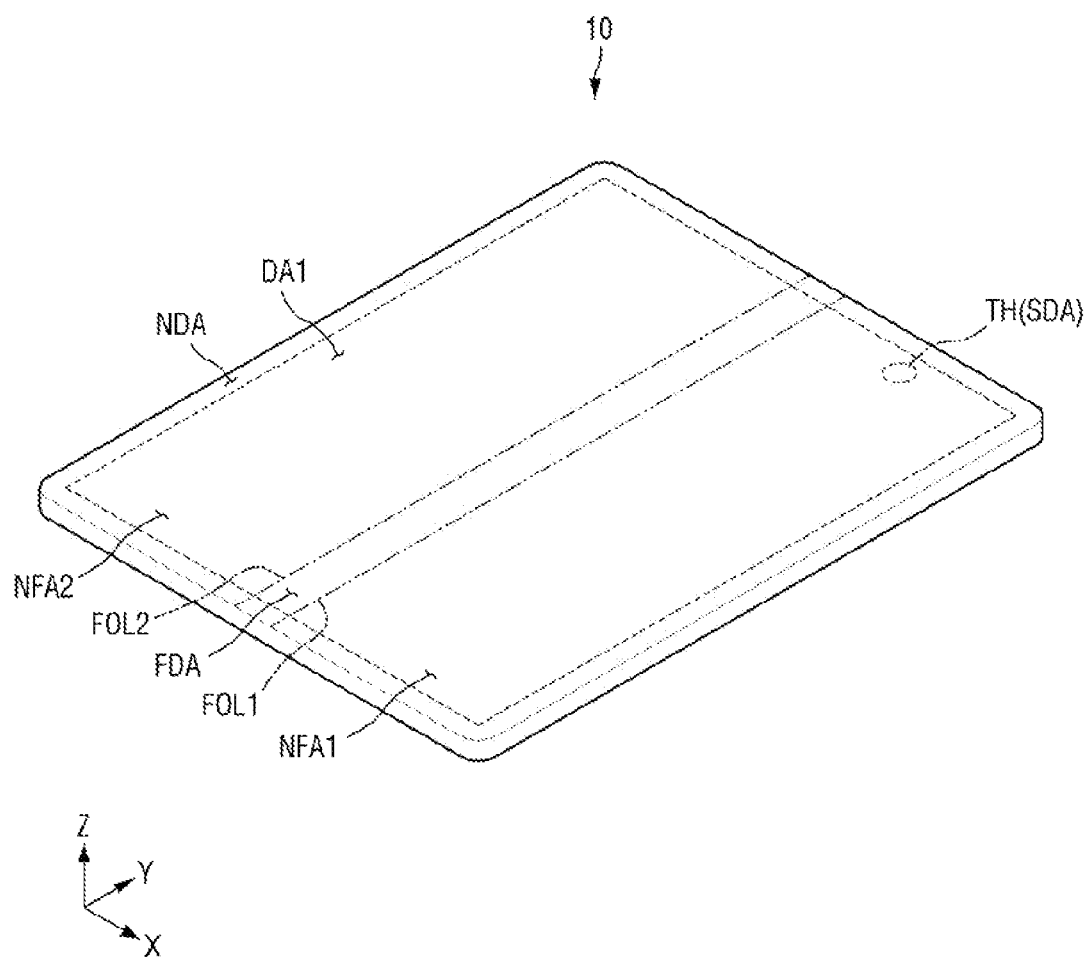
FIG. 21 is a perspective view diagram illustrating a display device according to an embodiment of the present disclosure.
Figure 22:
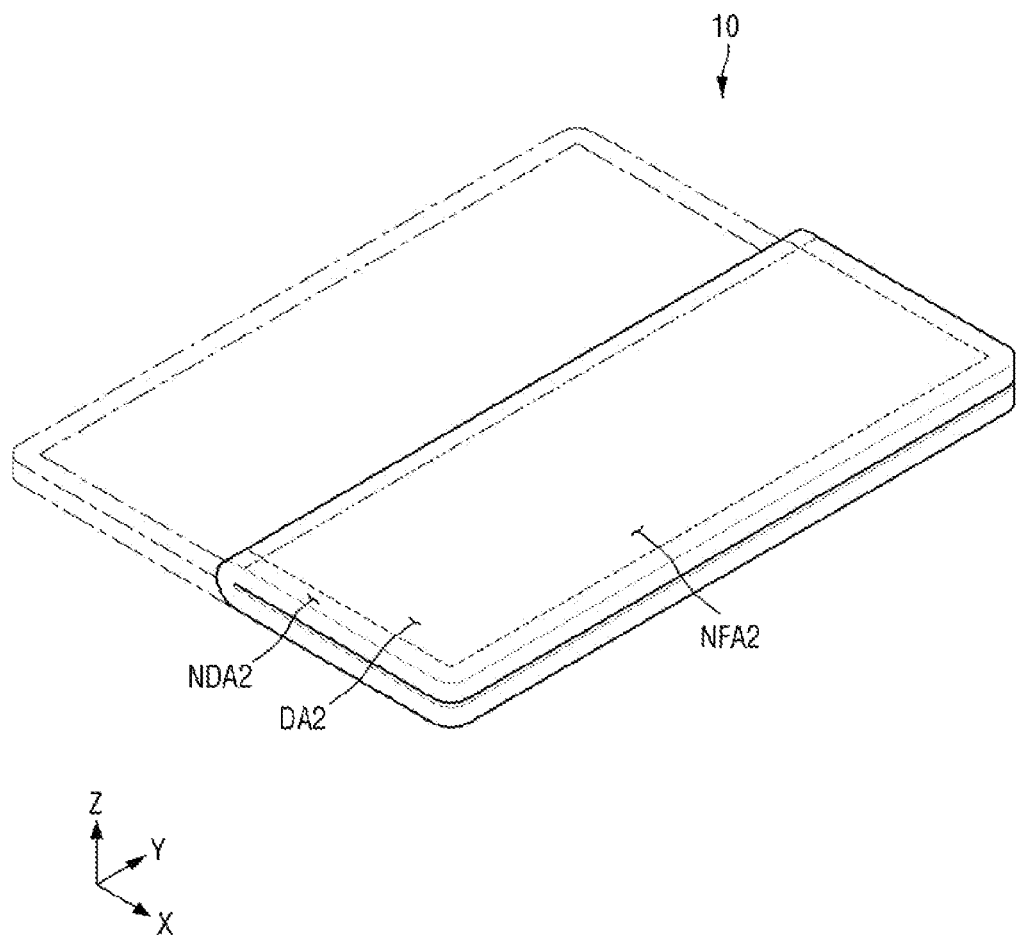
FIG. 22 is a perspective view diagram illustrating a display device according to an embodiment of the present disclosure.

FIGS. 21 and 22 are perspective views illustrating a display device according to an embodiment of the present disclosure.

FIGS. 21 and 22 illustrate that the display device 10 is a foldable display device that is folded in the first direction (X-axis direction). The display device 10 may maintain both a folded state and an unfolded state. The display device 10 may be folded in an in-folding manner in which a front surface thereof is disposed inside. When the display device 10 is bent or folded in the in-folding manner, the front surfaces of the display device 10 may be disposed to face each other. Alternatively, the display device 10 may be folded in an out-folding manner in which the front surface thereof is disposed on the outside. When the display device 10 is bent or folded in the out-folding manner, the rear surfaces of the display device 10 may be disposed to face each other.

A first non-folding area NFA1 may be disposed on one side, for example, a right side of a folding area FDA. A second non-folding area NFA2 may be disposed on the other side, for example, a left side of the folding area FDA. The touch sensing unit TSU according to the embodiment of the present specification may be formed and disposed on the first non-folding area NFA1 and the second non-folding area NFA2, respectively.

A first folding line FOL1 and a second folding line FOL2 may extend in the second direction (Y-axis direction), and the display device 10 may be folded in the first direction (X-axis direction). Accordingly, since a length of the display device 10 in the first direction (X-axis direction) may be reduced by about half, it may be convenient for the user to carry the display device 10.

The extending direction of the first folding line FOL1 and the extending direction of the second folding line FOL2 are not limited to the second direction (Y-axis direction). For example, the first folding line FOL1 and the second folding line FOL2 may extend in the first direction (X-axis direction), and the display device 10 may be folded in the second direction (Y-axis direction). In this case, a length of the display device 10 in the second direction (the Y-axis direction) may be reduced by about half. Alternatively, the first folding line FOL1 and the second folding line FOL2 may extend in a diagonal direction between the first direction (X-axis direction) and the second direction (Y-axis direction) of the display device 10. In this case, the display device 10 may be folded in a triangular shape.

When the first folding line FOL1 and the second folding line FOL2 extend in the second direction (Y-axis direction), a length of the folding area FDA in the first direction (X-axis direction) may be shorter than a length thereof in the second direction (Y-axis direction). In addition, a length of the first non-folding area NFA1 in the first direction (X-axis direction) may be longer than the length of the folding area FDA in the first direction (X-axis direction). A length of the second non-folding area NFA2 in the first direction (X-axis direction) may be longer than the length of the folding area FDA in the first direction (X-axis direction).

A first display area DA1 may be disposed on the front surface of the display device 10. The first display area DA1 may overlap the folding area FDA, the first non-folding area NFA1, and the second non-folding area NFA2. Therefore, when the display device 10 is unfolded, an image may be displayed in a front direction in the folding area FDA, the first non-folding area NFA1, and the second non-folding area NFA2 of the display device 10.

A second display area DA2 may be disposed on the rear surface of the display device 10. The second display area DA2 may overlap the second non-folding area NFA2. Therefore, when the display device 10 is folded, an image may be displayed in the front direction in the second non-folding area NFA2 of the display device 10.

FIGS. 21 and 22 illustrate that a through hole TH in which a camera SDA is formed is disposed in the first non-folding area NFA1, but the present disclosure is not limited thereto. The through hole TH or the camera SDA may be disposed in the second non-folding area NFA2 or the folding area FDA.

Figure 23:
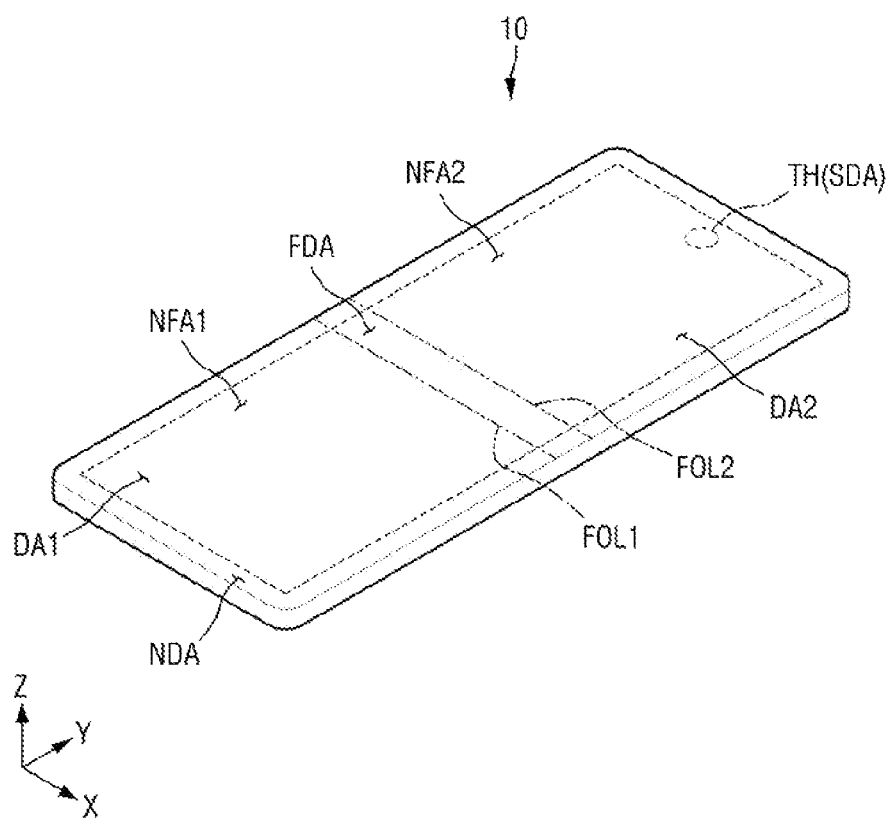
FIG. 23 is a perspective view diagram illustrating a display device according to an embodiment of the present disclosure.
Figure 24:
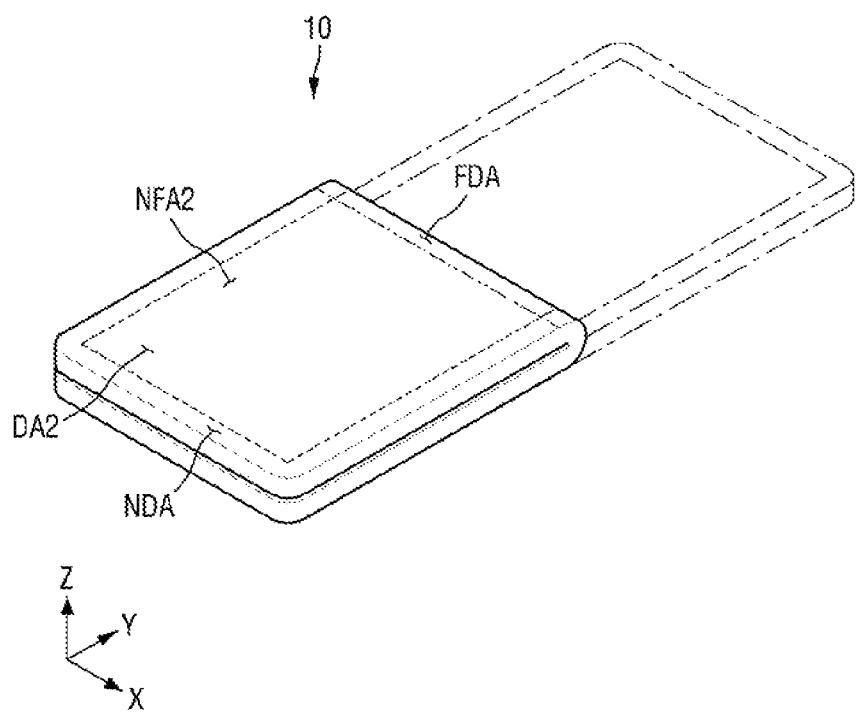
FIG. 24 is a perspective view diagram illustrating a display device according to an embodiment of the present disclosure.

FIGS. 23 and 24 are perspective views illustrating a display device according to an embodiment of the present disclosure.

FIGS. 23 and 24 illustrate that the display device 10 is a foldable display device that is folded in the second direction (Y-axis direction). The display device 10 may maintain both a folded state and an unfolded state. The display device 10 may be folded in an in-folding manner in which a front surface thereof is disposed inside. When the display device 10 is bent or folded in the in-folding manner, the front surfaces of the display device 10 may be disposed to face each other. Alternatively, the display device 10 may be folded in an out-folding manner in which the front surface thereof is disposed on the outside. When the display device 10 is bent or folded in the out-folding manner, the rear surfaces of the display device 10 may be disposed to face each other.

The display device 10 may include a folding area FDA, a first non-folding area NFA1, and a second non-folding area NFA2. The folding area FDA may be an area in which the display device 10 is folded, and the first non-folding area NFA1 and the second non-folding area NFA2 may be areas in which the display device 10 is not folded. The first non-folding area NFA1 may be disposed on one side, for example, a lower side of the folding area FDA. The second non-folding area NFA2 may be disposed on the other side, for example, an upper side of the folding area FDA.

The touch sensing unit TSU according to the embodiment of the present specification may be formed and disposed on the first non-folding area NFA1 and the second non-folding area NFA2, respectively.

On the other hand, the folding area FDA may be an area bent with a predetermined curvature at the first folding line FOL1 and the second folding line FOL2. Therefore, the first folding line FOL1 may be a boundary between the folding area FDA and the first non-folding area NFA1, and the second folding line FOL2 may be a boundary between the folding area FDA and the second non-folding area NFA2.

As shown in FIGS. 23 and 24, the first folding line FOL1 and the second folding line FOL2 may extend in the first direction (X-axis direction), and the display device 10 may be folded in the second direction (Y-axis direction). Accordingly, since a length of the display device 10 in the second direction (Y-axis direction) may be reduced by about half, it may be convenient for the user to carry the display device 10.

The extending direction of the first folding line FOL1 and the extending direction of the second folding line FOL2 are not limited to the first direction (X-axis direction). For example, the first folding line FOL1 and the second folding line FOL2 may extend in the second direction (Y-axis direction), and the display device 10 may be folded in the first direction (X-axis direction). In this case, a length of the display device 10 in the first direction (the X-axis direction) may be reduced by about half. Alternatively, the first folding line FOL1 and the second folding line FOL2 may extend in a diagonal direction between the first direction (X-axis direction) and the second direction (Y-axis direction) of the display device 10. In this case, the display device 10 may be folded in a triangular shape.

When the first folding line FOL1 and the second folding line FOL2 extend in the first direction (X-axis direction) as shown in FIGS. 23 and 24, a length of the folding area FDA in the second direction (Y-axis direction) may be shorter than a length thereof in the first direction (X-axis direction). In addition, a length of the first non-folding area NFA1 in the second direction (Y-axis direction) may be longer than the length of the folding area FDA in the second direction (Y-axis direction). In addition, a length of the second non-folding area NFA2 in the second direction (Y-axis direction) may be longer than the length of the folding area FDA in the second direction (Y-axis direction).

A first display area DA1 may be disposed on the front surface of the display device 10. The first display area DA1 may overlap the folding area FDA, the first non-folding area NFA1, and the second non-folding area NFA2. Therefore, when the display device 10 is unfolded, an image may be displayed in a front direction in the folding area FDA, the first non-folding area NFA1, and the second non-folding area NFA2 of the display device 10.

A second display area DA2 may be disposed on the rear surface of the display device 10. The second display area DA2 may overlap the second non-folding area NFA2. Therefore, when the display device 10 is folded, an image may be displayed in the front direction in the second non-folding area NFA2 of the display device 10.

FIGS. 23 and 24 illustrate that a through hole TH in which a camera SDA is disposed is disposed in the second non-folding area NFA2, but the present disclosure is not limited thereto. The through hole TH may be disposed in the first non-folding area NFA1 or the folding area FDA.

In concluding the detailed description, those of ordinary skill in the pertinent art will appreciate that many variations and modifications can be made to the disclosed or other embodiments without substantially departing from the principles of the present disclosure. Therefore, the disclosed embodiments are used in a generic and descriptive sense and not for purposes of limitation.

What is claimed is:

1. A display device comprising:
a display unit including a plurality of light emitting areas;
a plurality of touch electrodes disposed between the plurality of light emitting areas and configured to sense a touch;
a plurality of grid patterns separated from the plurality of touch electrodes in a preset shape or formed integrally with the plurality of touch electrodes; and
a plurality of code patterns formed in a preset code shape in some areas of a front surface corresponding to the plurality of touch electrodes,
wherein the plurality of grid patterns comprise grid reference points of intersecting grid reference lines, and are respectively formed at positions corresponding to the grid reference points,
wherein the plurality of grid patterns are formed to have a width or an extent in at least one of horizontal, vertical, and diagonal directions in plan view that is wider than a width or an extent of each of the plurality of touch electrodes.

2. The display device of claim 1,
wherein the grid reference lines are formed in a touch input device,
wherein the plurality of grid patterns are formed to protrude in at least one direction from the plurality of touch electrodes at positions of the grid reference points, or are formed to be separated from the plurality of touch electrodes in an island shape at the positions of the grid reference points.

3. The display device of claim 2, wherein the plurality of grid patterns have light reflectivity higher than light reflectivity of the surrounding touch electrodes.

4. The display device of claim 2,
wherein the plurality of grid patterns are respectively formed in a shape of a polygon, a circle, or an ellipse between the light emitting areas adjacent to each other, or are formed in a closed loop shape of one of a rectangle, a square, a circle, or a rhombus surrounding around at least one light emitting area, or are formed in a mesh structure by surrounding between and around the plurality of light emitting areas,
wherein each of the plurality of grid patterns has infrared reflectivity higher than the surrounding touch electrodes and any adjacent dummy electrodes, respectively.

5. The display device of claim 2,
wherein the plurality of code patterns include a light blocking member for forming a preset planar code shape by covering some of the plurality of touch electrodes with a preset area,
wherein the plurality of touch electrodes are capacitive.

6. The display device of claim 5, wherein the plurality of code patterns are respectively formed between the plurality of grid patterns at preset intervals so as not to overlap the plurality of grid patterns, respectively.

7. The display device of claim 5, wherein the plurality of code patterns are formed in a closed loop shape of one of a rectangle, a square, a circle, or a rhombus surrounding around at least one light emitting area, or are formed in a mesh structure by surrounding between and around the plurality of light emitting areas.

8. The display device of claim 5, wherein the plurality of code patterns are formed to have a wider width than widths of front and side surfaces of the plurality of touch electrodes.

9. A touch input system comprising:
a display device for displaying an image; and
a touch input device for inputting a touch to the display device,
wherein the display device includes:
a display unit including a plurality of light emitting areas;
a plurality of touch electrodes disposed between the plurality of light emitting areas to sense a touch;
a plurality of grid patterns separated from the plurality of touch electrodes in a preset shape or formed integrally with the plurality of touch electrodes; and
a plurality of code patterns formed in a preset code shape in some areas of a front surface corresponding to the plurality of touch electrodes,
wherein the plurality of grid patterns are patterns serving as grid reference points of grid reference lines formed for calculating touch coordinates in the touch input device,
wherein the plurality of grid patterns are formed to have a width or an extent in at least one of horizontal, vertical, and diagonal directions in plan view that is wider than a width or an extent of each of the plurality of touch electrodes.

10. The touch input system of claim 9,
wherein plurality of grid patterns are respectively formed at positions corresponding to the grid reference points,
wherein the plurality of grid patterns are formed to protrude in at least one direction from the plurality of touch electrodes at positions of the grid reference points, or are formed to be separated from the plurality of touch electrodes in an island shape at the positions of the grid reference points.

11. The touch input system of claim 10, wherein the plurality of grid patterns have light reflectivity higher than light reflectivity of the surrounding touch electrodes.

12. The touch input system of claim 10, wherein the plurality of grid patterns are respectively formed in a shape of a polygon, a circle, or an ellipse between the light emitting areas adjacent to each other, or are formed in a closed loop shape of one of a rectangle, a square, a circle, or a rhombus surrounding around at least one light emitting area, or are formed in a mesh structure by surrounding between and around the plurality of light emitting areas.

13. The touch input system of claim 10, wherein the plurality of code patterns include a light blocking member for forming a preset planar code shape by covering some of the plurality of touch electrodes with a preset area.

14. The touch input system of claim 13, wherein the plurality of code patterns are respectively formed between the plurality of grid patterns at preset intervals so as not to overlap the plurality of grid patterns, respectively.

15. The touch input system of claim 13, wherein the plurality of code patterns are formed in a closed loop shape of one of a rectangle, a square, a circle, or a rhombus surrounding around at least one light emitting area, or are formed in a mesh structure by surrounding between and around the plurality of light emitting areas.

16. The touch input system of claim 13, wherein the plurality of code patterns are formed to have a wider width than widths of front and side surfaces of the plurality of touch electrodes.

17. The touch input system of claim 10, further comprising:
- a code detection unit sensing the plurality of grid patterns and the plurality of code patterns to detect grid pattern shape data and code pattern shape data; and
- a code processor identifying shapes and arrangement structures of the plurality of grid patterns and the plurality of code patterns, respectively, to extract coordinate data.

18. The touch input system of claim 17, wherein the code detection unit generates the grid pattern shape data according to an amount of emitted or reflected light reflected from the plurality of grid patterns, a reflection shape, and an arrangement position, and generates and outputs the code pattern shape data according to a reflection shape reflected from the plurality of code patterns and an arrangement position.

19. The touch input system of claim 18, wherein the code processor extracts and forms the plurality of grid reference lines by connecting arrangement positions of the plurality of grid patterns with a straight line based on the arrangement positions of the plurality of grid patterns included in the grid pattern shape data.

20. The touch input system of claim 19, wherein the code processor matches and compares the plurality of grid reference lines with the code pattern shape data to extract touch position coordinates and coordinate data according to a comparison result, and transmits the touch position coordinates and the coordinate data to the display device.

21. A touch input device comprising:
- a code processor configured for calculating touch coordinates; and
- grid reference lines coupled to the code processor,
- wherein the grid reference lines form an intersecting pattern,
- wherein the intersecting pattern defines grid reference points at intersections of the grid reference lines,
- wherein the grid reference points define grid reference patterns relative to touch electrodes,
- wherein the grid reference patterns are formed to have a width or an extent in at least one of horizontal, vertical, and diagonal directions in plan view that is wider than a width or an extent of each of the plurality of touch electrodes,
- wherein code patterns define a preset code shape corresponding to the touch electrodes.

* * * * *